US007715069B2

(12) United States Patent
Nakano et al.

(10) Patent No.: US 7,715,069 B2
(45) Date of Patent: May 11, 2010

(54) METHOD FOR MEASURING DENSITY, PRINTING METHOD, METHOD OF CALCULATING CORRECTION VALUE, METHOD OF MANUFACTURING PRINTING APPARATUS AND METHOD FOR OBTAINING CORRECTION VALUE

(75) Inventors: Tatsuya Nakano, Nagano-ken (JP); Masahiko Yoshida, Nagano-ken (JP); Keigo Yamasaki, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 1029 days.

(21) Appl. No.: 11/412,936

(22) Filed: Apr. 28, 2006

(65) Prior Publication Data

US 2006/0262361 A1 Nov. 23, 2006

(30) Foreign Application Priority Data

Apr. 28, 2005 (JP) ............................. 2005-133699
Apr. 28, 2005 (JP) ............................. 2005-133701

(51) Int. Cl.
*H04N 1/46* (2006.01)

(52) U.S. Cl. ....................... 358/504; 358/406; 358/518; 347/19

(58) Field of Classification Search ....................... None
See application file for complete search history.

(56) References Cited

U.S. PATENT DOCUMENTS

| | | | | |
|---|---|---|---|---|
| 5,995,248 | A * | 11/1999 | Katori et al. | 358/2.1 |
| 6,055,073 | A * | 4/2000 | Nomura et al. | 358/518 |
| 6,693,752 | B2 * | 2/2004 | Azumai | 359/896 |
| 6,814,506 | B2 * | 11/2004 | Nanami | 396/569 |
| 6,832,825 | B1 * | 12/2004 | Nishikori et al. | 347/19 |
| 7,023,581 | B2 * | 4/2006 | Soler et al. | 358/1.9 |
| 7,294,820 | B2 * | 11/2007 | Moody et al. | 250/214 VT |
| 7,570,402 | B2 * | 8/2009 | Yoshida | 358/521 |
| 2001/0035889 | A1 * | 11/2001 | Mikami | 347/19 |
| 2002/0180998 | A1 * | 12/2002 | Wu | 358/1.9 |
| 2004/0012800 | A1 * | 1/2004 | Nakane et al. | 358/1.9 |
| 2006/0232835 | A1 * | 10/2006 | Goma et al. | 358/504 |

FOREIGN PATENT DOCUMENTS

| | | |
|---|---|---|
| JP | 02-054676 A | 2/1990 |
| JP | 06-166247 A | 6/1994 |

* cited by examiner

*Primary Examiner*—Mark K Zimmerman
*Assistant Examiner*—Dung D Tran
(74) *Attorney, Agent, or Firm*—Sughrue Mion, PLLC

(57) ABSTRACT

A method for measuring density, includes: forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles; reading the pattern by a scanner; measuring density of each of the row regions of the read pattern; calculating respective modification values corresponding to each of the row regions, based on at least a part of a measurement result of the density of the plurality of the row regions; and modifying respective measured values of the density of each of the row regions based on the respective modification values corresponding to each of the row regions.

14 Claims, 31 Drawing Sheets

| row region No. | measured value (cyan) | | | | |
|---|---|---|---|---|---|
| | 76 (30%) | 102 (40%) | 128 (50%) | 153 (60%) | 179 (70%) |
| 1 | 78 | 100 | 125 | 155 | 182 |
| 2 | 75 | 99 | 128 | 151 | 179 |
| 3 | 76 | 103 | 130 | 152 | 176 |
| ⋮ | | ⋮ | | ⋮ | |
| 115 | 77 | 101 | 127 | 154 | 183 |
| 116 | 72 | 99 | 128 | 156 | 184 |

table of correction values for front-end print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| ⋮ | | ⋮ | |
| 29 | Hb_29 | Hc_29 | Hd_29 |
| 30 | Hb_30 | Hc_30 | Hd_30 |

table of correction values for regular print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| 4 | Hb_4 | Hc_4 | Hd_4 |
| 5 | Hb_5 | Hc_5 | Hd_5 |
| 6 | Hb_6 | Hc_6 | Hd_6 |
| 7 | Hb_7 | Hc_7 | Hd_7 |

table of correction values for rear-end print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| ⋮ | | ⋮ | |
| 29 | Hb_29 | Hc_29 | Hd_29 |
| 30 | Hb_30 | Hc_30 | Hd_30 |

Fig.21

In case that average values are not used for calculation of correction values
(For comparison)

In case that average values are used for calculation of correction values

METHOD FOR MEASURING DENSITY, PRINTING METHOD, METHOD OF CALCULATING CORRECTION VALUE, METHOD OF MANUFACTURING PRINTING APPARATUS AND METHOD FOR OBTAINING CORRECTION VALUE

CROSS-REFERENCE TO RELATED APPLICATIONS

The present application claims priority from Japanese Patent Applications No. 2005-133699 and No. 2005-133701 filed on Apr. 28, 2005, which are herein incorporated by reference.

BACKGROUND

1. Technical Field

The invention relates to a method for measuring density, a printing method, a method of calculating a correction value, a method of manufacturing a printing apparatus, and a method for obtaining a correction value.

2. Related Art

There is known a printing apparatus which prints a print image on a medium (such as paper, cloth, and OHP film) by repeating alternately the following actions: a dot formation action in which dots are formed on the medium by ejecting ink from a head moving in a movement direction and a carrying action in which the medium is carried. The print image printed with the printing apparatus is formed by lining up in a carrying direction a myriad of pieces of image which consist of dot rows.

The dot row which each piece of image consists of is formed by making an ink droplet ejected from a nozzle of the head land on the medium. If an ink droplet of ideal size lands on an ideal position, each of the dot rows is formed in their respective predetermined region (row region), and a piece of image with ideal density is formed in the region. However, actually, because of influence by variation in precision of manufacturing and the like, variation in density occurs among the pieces of image formed in the respective regions. As a result thereof, a streaky unevenness in density occurs in the print image.

Therefore, technologies for suppressing this unevenness in density and improving print image quality are proposed (see JP-A-2-54676 and JP-A-6-166247, for example).

An image processing unit disclosed in JP-A-2-54676 performs sampling of an image by a CCD sensor and outputs the digitized data through an inkjet printer. In order to correct unevenness in density, an image processing unit disclosed in JP-A-2-54676 stores as coefficients characteristics of variation in gain of the CCD sensor and characteristics of unevenness in density of a head, and performs binarization in contemplation of these coefficients.

In a method of correcting unevenness in recorded density which is disclosed in JP-A-6-166247, patterns for detecting unevenness in density are printed and unevenness in density is corrected based on density data of the patterns for detecting unevenness in density.

JP-A-2-54676 does not disclose how to obtain coefficients reflecting characteristics of variation in gain of the CCD sensor. Accordingly, depending on a method for obtaining these coefficients, there are cases in which these coefficients cannot reflect characteristics of the CCD sensor properly. If these coefficients do not reflect characteristics of the CCD sensor properly, unevenness in density occurs in a print image. In JP-A-6-166247, after the patterns for detecting unevenness in density are printed, the patterns for detecting unevenness in density are read by an image sensor, and density data is created. However, if an image sensor cannot read the patterns for detecting unevenness in density properly, unevenness in density cannot be corrected properly and unevenness in density occurs in a print image.

SUMMARY

Therefore, an advantage of a method for measuring density of the invention is to modify measured values of density properly. In addition, an advantage of a method for obtaining a correction value of the invention is to obtain a correction value which is appropriate to correct unevenness in density. It should be noted that in a technology for correcting unevenness in density disclosed in JP-A-6-166247, image data is corrected based on a correction value corresponding to each nozzle.

However, there are cases in which there is difference in density of color even among pieces of image formed by the same nozzle. For example, there are cases in which there is difference in density of color even among pieces of image consisting of dot rows formed by the same nozzle if dot rows contiguous to each of the above-mentioned dot rows have different characteristics. In this case, the correction value corresponding only to each nozzle cannot suppress unevenness in density.

Accordingly, in the invention, unevenness in density is suppressed by storing a correction value corresponding to a row region in which a dot row is to be formed and correcting density of each piece of image depending on the correction value.

BRIEF DESCRIPTION OF THE DRAWINGS

FIG. 7A shows positions of the head and how dots are formed in each of the pass n through pass n+3, and FIG. 7B shows positions of the head and how dots are formed in each of the pass n through pass n+4.

FIG. 21 is an explanatory diagram showing a table of correction values of cyan.

FIG. 26A is a graph in case that a scanner is in normal operation, and FIG. 26B is a graph in case that a scanner is in abnormal operation.

DESCRIPTION OF EXEMPLARY EMBODIMENTS

Figure 1:
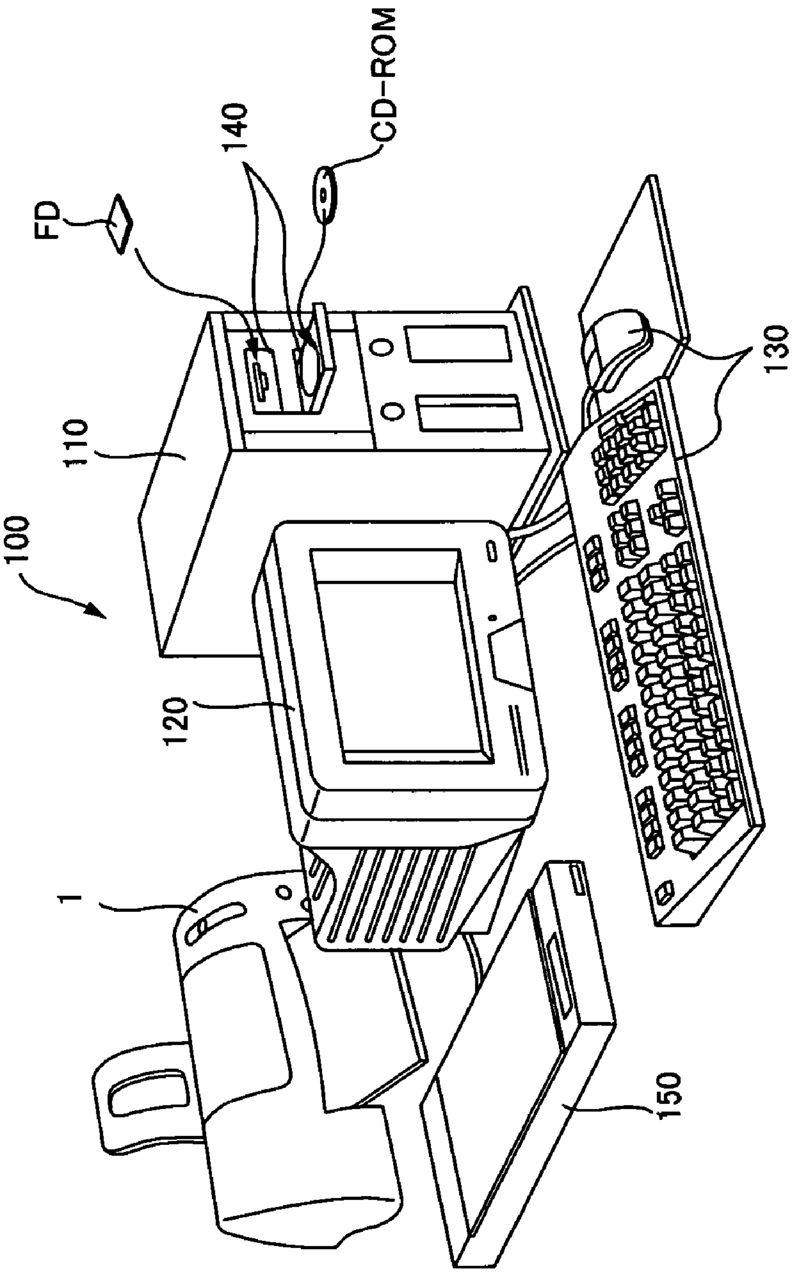
FIG. 1 is an explanatory diagram showing the configuration of a printing system 100.

The specification and the drawings describe at least the followings:

A method for measuring density, including:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions; and modifying respective measured values of the density of each of the row regions based on the respective modification values corresponding to each of the row regions.

This method for measuring density enables to modify the measured values properly.

In the method for measuring density, it is desirable that the respective modification values corresponding to each of the row regions are calculated based on a measurement result obtained by excluding a measurement result of the row region located at an end section of the pattern from the above-mentioned measurement result of the density of the row regions. As a result thereof, the measured values can be modified properly.

What is desirable is a method for measuring density in which a linear fitting line and an average value are obtained from the at least a part the measurement result and in which the respective modification values corresponding to each of the row regions are calculated depending on difference between a value of the linear fitting line in each of the row regions and the average value. This enables to modify a gradient throughout the measured values. In addition, it is preferable to calculate the linear fitting line based on the least-square method. This enables to grasp the tendency of the gradient of the measured values.

What is desirable is a method for measuring density in which, if the pattern has a first dot row formed by first printing and a second dot row formed by second printing that is different from the above-mentioned first printing, the at least a part of the measurement result includes a measured value of density of the row region in which the first dot row is to be formed and a measured value of density of the row region in which the second dot row is to be formed. This enables to calculate a linear fitting line that reflects both of first printing and second printing.

A printing method, including:

forming on a medium a pattern which consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions;

calculating correction values corresponding respectively to the row regions based on the respective modified measured values; and when forming a print image on a medium, forming dot rows that the print image consists of, based on the correction values corresponding respectively to the row regions in which the dot rows are to be formed.

This printing method enables to form a print image without unevenness in density.

What is desirable is a printing method in which the correction values corresponding respectively to a predetermined number of the row regions are calculated, respectively and in which, when forming the print image on the medium, the dot rows are formed by using the correction values corresponding respectively to the predetermined number of the row region repeatedly for each set of the predetermined number of the row regions that the print image consists of. Even in this case, the occurrence of streaks in a print image can be suppressed.

What is desirable is a printing method in which, when forming the print image on the medium, a dot formation process in which the dot rows are formed and a carrying process in which the medium is carried with a predetermined carry amount are repeated and in which the correction value corresponding to a certain row region is calculated based on the measured value of density of the certain row region and the measured value of density of another row region that is located an integer multiple of the carry amount from the above-mentioned certain row region. Even in this case, the occurrence of the difference in density in a print image can be suppressed.

What is desirable is a printing method in which, when forming the print image on the medium, the correction value corresponding to the certain row region is used for forming a dot row to be formed in the certain row region and for forming a dot row to be formed in another row region that is located an integer multiple of the carry amount from the above-mentioned certain row region. As a result thereof, the number of correction values to be stored can be reduced. This is effective especially when the certain row region is located in the regular print region.

What is desirable is a printing method in which the regular print region of the pattern is smaller than the regular print region of the print image. As a result thereof, the length of the pattern can be made short.

A method of calculating a correction value, including:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions; and calculating correction values corresponding respectively to the row regions based on the respective modified measured values.

This method of calculating a correction value enables to calculate a proper correction value.

A method of manufacturing a printing apparatus, including:

preparing a printing apparatus having a memory;

using the printing apparatus, forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions;

calculating correction values corresponding respectively to the row regions based on the respective modified measured values; and storing the correction values in the memory This method of manufacturing a printing apparatus enables to manufacture a printing apparatus which can suppress unevenness in density.

A method of manufacturing a printing apparatus, including:

preparing a printing apparatus having a memory;

using the printing apparatus, forming a pattern that consists of a plurality of dot rows formed respectively in a plurality of row regions lined up in a direction intersecting a movement direction of nozzles;

reading the pattern by a scanner;

measuring density of each of the row regions of the read pattern;

calculating a first correction value for correcting the density of a row regions that is located in a first region of the pattern, based on a measured value of the density of that row region that is located in the first region;

calculating a second correction value for correcting the density of a row region that is located in a second region contiguous to the first region, based on a measured value of the density of that row region and a measured value of the density of another row region that is located in the second region;

modifying at least one of the first correction value and the second correction value in order to reduce a difference between the first correction value and the second correction value; and storing the at least one modified correction value in the memory. If a correction value obtained by this method for obtaining a correction value is used, print image quality can improve.

What is desirable is a method for obtaining a correction value in which at least one of the first correction value and the second correction value is modified in order to reduce a difference between an average value of a plurality of the first correction values and an average value of a plurality of the second correction values. In addition, it is preferable that the difference between the average value of the first correction values and the average value of the second correction values is determined as a modification value and that at least one of the first correction value and the second correction value is modified based on the modification value. As a result thereof, the difference in density at the boundary between each of print regions can be reduced. However, in order to reduce a difference between the first correction value of a row region that is located in the first region and is contiguous to the second region and the second correction value of a row region that is located in the second region and is contiguous to the first region, at least one of the first correction value and the second correction value can be modified. In this case, it is preferable that the difference between the first correction value of the row region which is located in the first region and is contiguous to the second region and the second correction value of the row region which is located in the second region and is contiguous to the first region is determined as a modification value and that at least one of the first correction value and the second correction value is modified based on the modification value.

What is desirable is a method for obtaining a correction value in which the measured values of the density of each of the row regions are modified depending on the row regions and in which the first correction value and the second correction value are calculated based on the modified measured values. In addition, it is preferable that, when modifying the measured values depending on the row regions, a linear fitting line and an average value are obtained from the measured values, and the measured values of the density of the row regions are modified depending on a difference between a value of the linear fitting line in each of the row regions and the average value. Furthermore, it is preferable to calculate the linear fitting line based on the least-square method. As a result thereof, even if a gradient of the measured values exists, a proper correction value can be obtained.

What is desirable is a method for obtaining a correction value in which the first region is a region including a first dot row formed by first printing and in which the second region is a region consisting of a second dot row formed by second printing that is different from the first printing. As a result thereof, the difference in density at a boundary between different print regions that are formed by different printing methods can be reduced.

A printing method, including:

reading by a scanner a pattern that consists of a plurality of dot rows formed respectively in a plurality of row regions lined up in a direction intersecting a movement direction of nozzles;

measuring density of each of the row regions of the read pattern;

calculating a first correction value for correcting the density of a row region that is located in a first region of the pattern, based on a measured value of the density of that row region that is located in the first region;

calculating a second correction value for correcting the density of a row region that is located in a second region contiguous to the first region, based on a measured value of the density of that row region and a measured value of the density of another row region that is located in the second region;

modifying at least one of the first correction value and the second correction value in order to reduce a difference between the first correction value and the second correction value;

when forming a print image on a medium, forming a dot row that is located in the first region and that the print image consists of, based on the first correction value corresponding to the row region in which that dot row is to be formed; and forming a dot row that is located in the second region and that the print image consists of, based on the second correction value corresponding to the row region in which that dot row is to be formed.

This printing method enables to improve print image quality.

A method of manufacturing a printing apparatus, including:

preparing a printing apparatus having a memory;

using the printing apparatus, forming a pattern that consists of a plurality of dot rows formed respectively in a plurality of row regions lined up in a direction intersecting a movement direction of nozzles;

reading the pattern by a scanner;

measuring density of each of the row regions of the read pattern;

calculating a first correction value for correcting the density of a row regions that is located in a first region of the pattern, based on a measured value of the density of that row region that is located in the first region;

calculating a second correction value for correcting the density of a row region that is located in a second region contiguous to the first region, based on a measured value of the density of that row region and a measured value of the density of another row region that is located in the second region;

modifying at least one of the first correction value and the second correction value in order to reduce a difference between the first correction value and the second correction value; and storing the at least one modified correction value in the memory. This method of manufacturing a printing apparatus enables to manufacture a printing apparatus having high image quality.

Configuration of Printing System

Printing System

FIG. 1 is an explanatory diagram showing the configuration of a printing system 100, which consists of at least a printing apparatus and a printing control apparatus that controls operations of the printing apparatus. The printing system 100 of the present embodiment is provided with a printer 1, a computer 110, a display device 120, input devices 130, record/play devices 140, and a scanner 150.

The printer 1 is for printing images on a medium such as paper, cloth, film, and OHP film. The computer 110 is communicably connected to the printer 1. In order to make the printer 1 print an image, the computer 110 outputs print data corresponding to that image to the printer 1. This computer 110 has computer programs, such as an application program and a printer driver, installed thereon. A scanner driver is installed on the computer 110 and is for controlling the scanner 150 and for receiving image data of a document read by the scanner 150.

Printer

Figure 2:
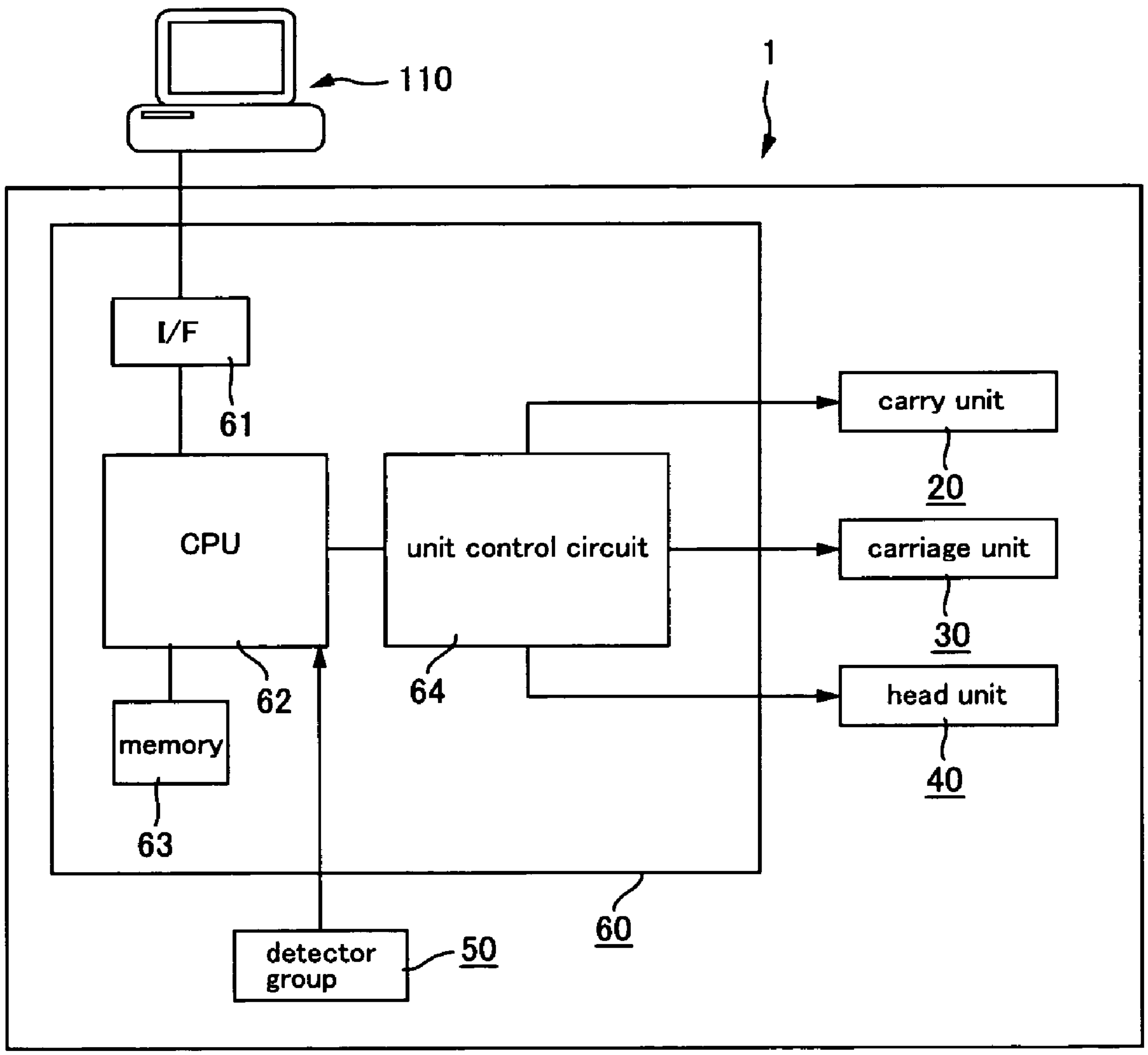
FIG. 2 is a block diagram showing the overall configuration of a printer 1.
Figure 3A:
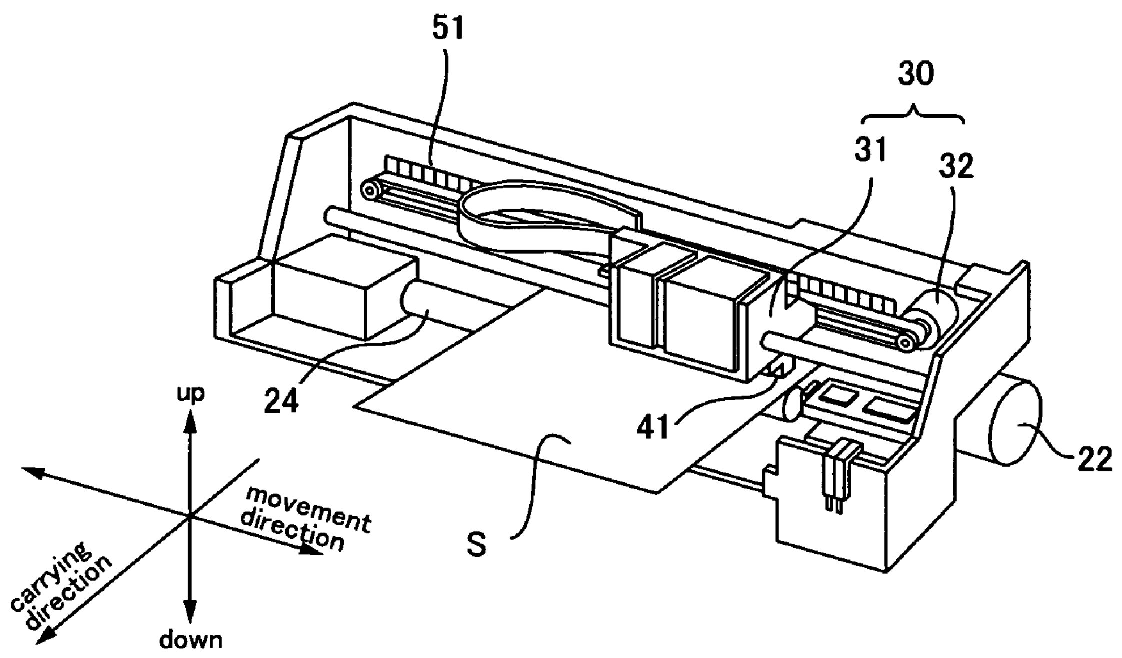
FIG. 3A is a schematic diagram showing the overall structure of the printer 1.
Figure 3B:
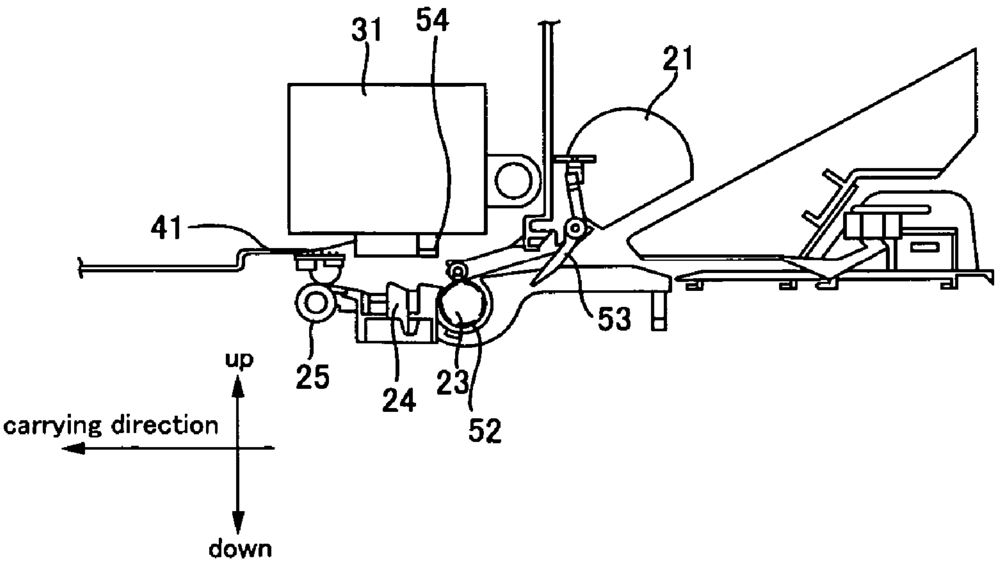
FIG. 3B is a horizontal sectional view of the overall structure of the printer 1.

FIG. 2 is a block diagram showing the overall configuration of the printer 1. FIG. 3A is a schematic diagram showing the overall structure of the printer 1. FIG. 3B is a horizontal sectional view of the overall structure of the printer 1. The basic structure of the printer according to the present embodiment is described below.

The printer 1 has a carry unit 20, a carriage unit 30, a head unit 40, a detector group 50, and a controller 60. The printer 1 receives print data from the computer 110, which is an external device, and controls the various units (the carry unit 20, the carriage unit 30, and the head unit 40) through the controller 60. The controller 60 controls these units based on the print data received from the computer 110 to print an image on the paper. The detector group 50 monitors the conditions within the printer 1, and outputs the result of this detection to the controller 60. The controller 60 controls these units based on this detection result received from the detector group 50.

The carry unit 20 is for carrying a medium such as paper in a predetermined direction (hereinafter, referred to as the carrying direction). The carry unit 20 has a paper supply roller 21, a carry motor 22 (also referred to as "PF motor"), a carry roller 23, a platen 24, and a paper discharge roller 25. The paper supply roller 21 is a roller for supplying, into the printer, paper that has been inserted into a paper insert opening. The carry roller 23 is a roller for carrying a paper S that has been supplied by the paper supply roller 21 up to a printable region, and is driven by the carry motor 22. The platen 24 supports the paper S being printed. The paper discharge roller 25 is a roller for discharging the paper S outside the printer, and is provided on the downstream side in the carrying direction with respect to the printable region. The paper discharge roller 25 is rotated in synchronization with the carry roller 23.

The carriage unit 30 is for making a head move (also referred to as "scan") in a predetermined direction (hereinafter, referred to as the movement direction). The carriage unit 30 has a carriage 31 and a carriage motor 32 (also referred to as "CR motor"). The carriage 31 can be moved back and forth in the movement direction. The carriage 31 detachably holds ink cartridges that contain ink. The carriage motor 32 is a motor for moving the carriage 31 in the movement direction.

The head unit 40 is for ejecting ink onto the paper. The head unit 40 has a head 41. The head 41 has a plurality of nozzles and intermittently ejects ink from those nozzles. The head 41 is provided in the carriage 31. Thus, when the carriage 31 moves in the movement direction, the head 41 also moves in the movement direction. Dot rows (raster lines) are formed on the paper in the movement direction due to the head 41 intermittently ejecting ink while moving in the movement direction.

Figure 4:
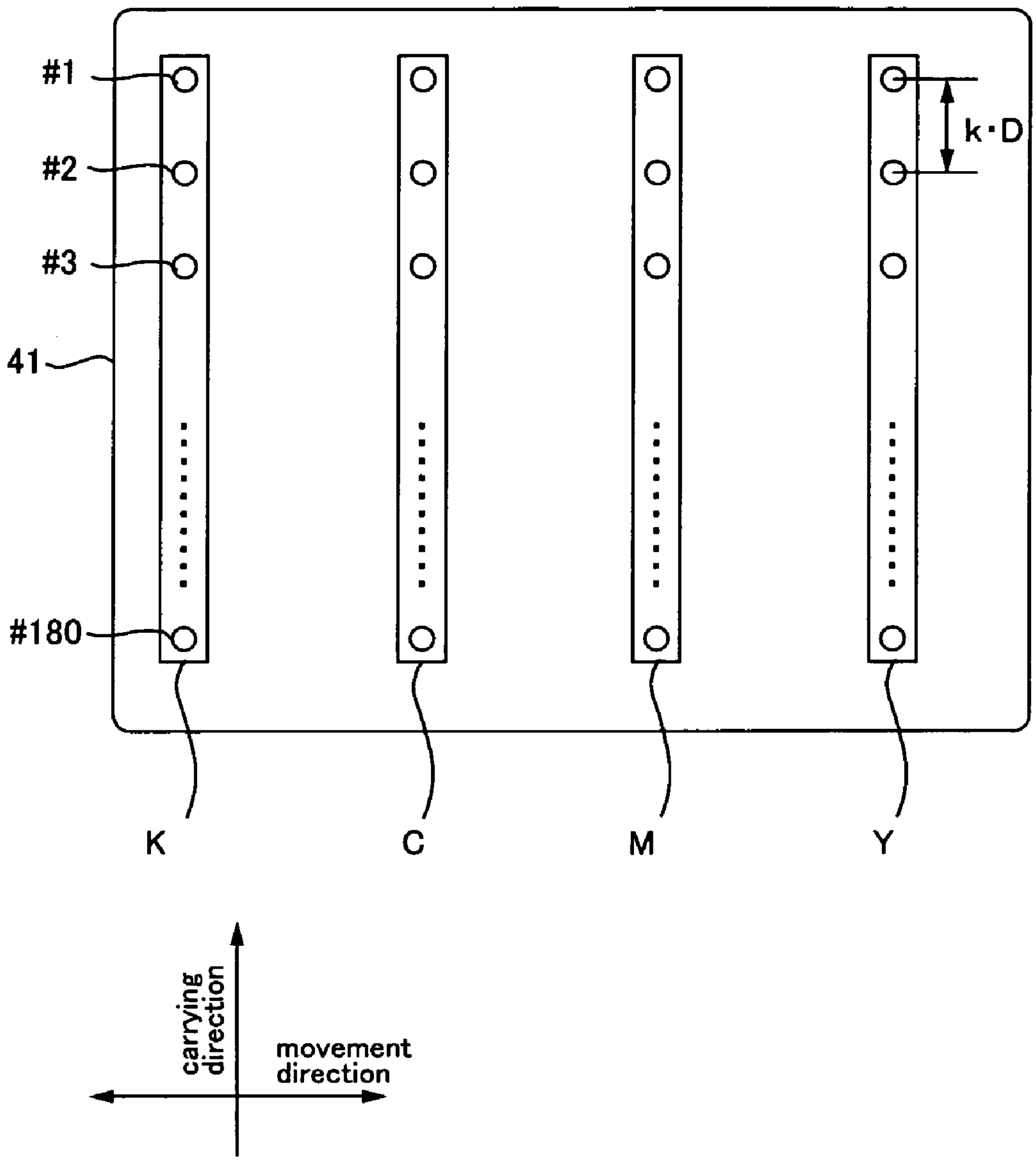
FIG. 4 is an explanatory diagram showing the arrangement of nozzles in the lower surface of a head 41.

FIG. 4 is an explanatory diagram showing the arrangement of the nozzles in the lower surface of the head 41. A black ink nozzle group K, a cyan ink nozzle group C, a magenta ink nozzle group M, and a yellow ink nozzle group Y are formed in the lower surface of the head 41. Each nozzle group is provided with a plurality of nozzles, which are ejection openings for ejecting ink of the respective colors. The plurality of nozzles of each of the nozzle groups are arranged in rows at a constant spacing (nozzle pitch: k·D) in the carrying direction. Here, D is the minimum dot pitch in the carrying direction (that is, the spacing between dots formed on the paper S at maximum resolution). Further, k is an integer of 1 or more. For example, if the nozzle pitch is 180 dpi (1/180 inch), and the dot pitch in the carrying direction is 720 dpi (1/720 inch), then k=4. Each nozzle of each of the nozzle groups is assigned a number (#1 to #180) that becomes smaller as the nozzle is arranged more downstream. Each nozzle is provided with an ink chamber (not shown) and a piezo element. Driving the piezo element causes the ink chamber to expand and contract, thereby ejecting an ink droplet from the nozzle.

The detector group 50 includes a linear encoder 51, a rotary encoder 52, a paper detection sensor 53, an optical sensor 54, and the like. The linear encoder 51 is for detecting the position of the carriage 31 in the movement direction. The rotary encoder 52 is for detecting the amount of rotation of the carry roller 23. The paper detection sensor 53 is for detecting the position of the front end of the paper to be printed. The optical sensor 54 is attached to the carriage 31. The optical sensor 54 detects whether or not the paper is present, through its light-receiving section detecting the reflected light of the light that has been irradiated onto the paper from its light-emitting section.

The controller 60 is a control section for carrying out control of the printer. The controller 60 includes an interface section 61, a CPU 62, a memory 63, and a unit control circuit 64. The interface section 61 is for exchanging data between the computer 110, which is an external device, and the printer 1. The CPU 62 is a processing unit for carrying out overall control of the printer. The memory 63 is for ensuring a working area and a storage area for the programs for the CPU 62, for instance, and includes storage devices such as a RAM or an EEPROM. The CPU 62 controls the various units via the unit control circuit 64 in accordance with programs stored in the memory 63.

Scanner

Figure 5A:
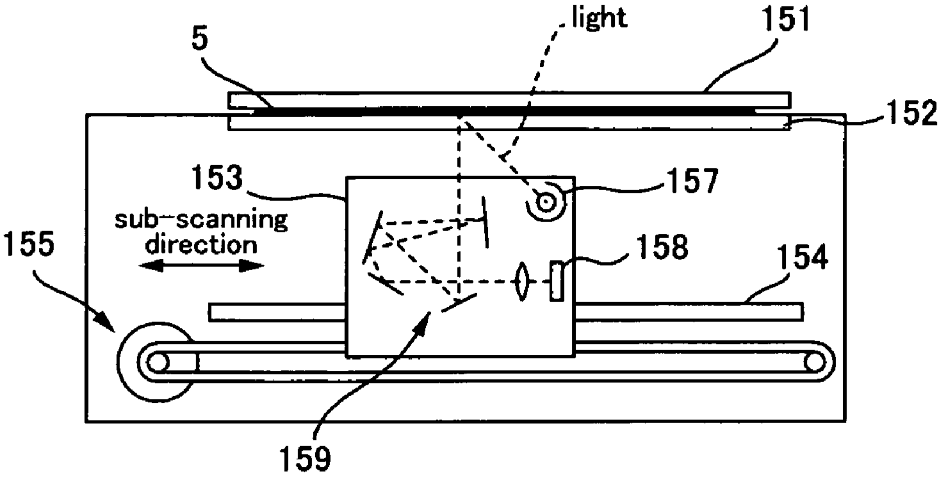
FIG. 5A is a vertical sectional view of a scanner 150.
Figure 5B:
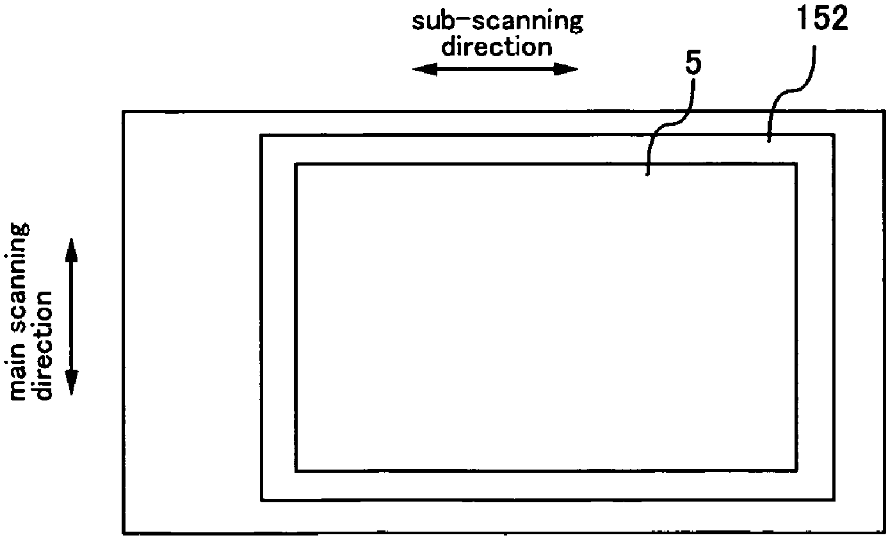
FIG. 5B is a plan view of the scanner 150 with a lid 151 detached.

FIG. 5A is a vertical sectional view of the scanner 150. FIG. 5B is a plan view of the scanner 150 with a lid 151 detached.

The scanner 150 is provided with the lid 151, a document platen glass 152 on which a document 5 is placed, a reading carriage 153 that faces the document 5 through the document platen glass 152 and that moves in a sub-scanning direction, a guiding member 154 for guiding the reading carriage 153 in the sub-scanning direction, a moving mechanism 155 for moving the reading carriage 153, and a scanner controller (not shown) that controls the various units of the scanner 150. The reading carriage 153 has an exposure lamp 157 that shines light on the document 5, a line sensor 158 that detects a line image in a main scanning direction (in FIG. 5A, the direction normal to the surface of the paper on which the figure is described), and optical devices 159 that lead the reflected light from the document 5 to the line sensor 158. Dashed lines in the reading carriage 153 shown in FIG. 5A show the path of light.

In order to read an image of the document 5, an operator raises the lid 151, places the document 5 on the document platen glass 152, and lowers the lid 151. The scanner controller moves the reading carriage 153 in the sub-scanning direction with the exposure lamp 157 emitting light, and the line sensor 158 reads the image on a surface of the document 5. The scanner controller transmits the read image data to the scanner driver installed on the computer 110, and thereby, the computer 110 obtains the image data of the document 5.

Printing Method

Regarding Printing Operation

Figure 6:
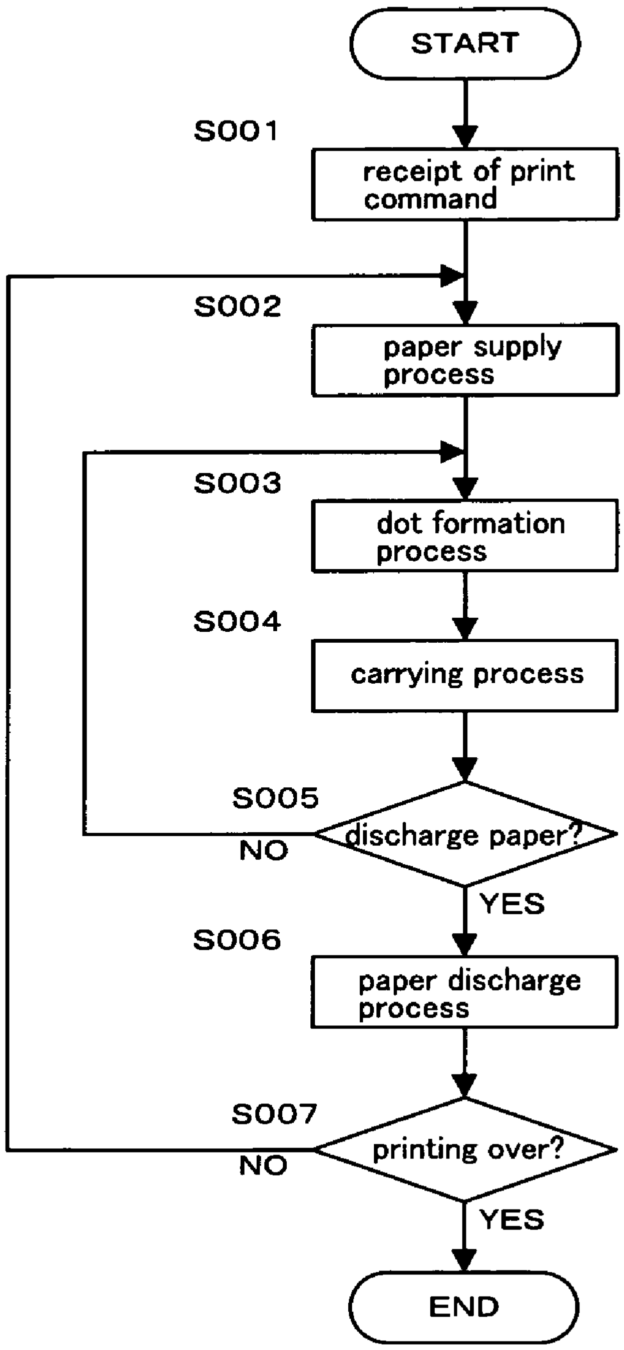
FIG. 6 is a flowchart of the processing during printing.

FIG. 6 is a flowchart of the processing during printing. The processes described below are executed by the controller 60 controlling the various units in accordance with a program stored in the memory 63. This program includes codes for executing the various processes.

Receipt of Print Command (S001): The controller 60 receives a print command via the interface section 61 from the computer 110. This print command is included in a header of print data transmitted from the computer 110. The controller 60 then analyzes the content of the various commands included in the print data received, and performs the following processes such as paper supply process, carrying process, and dot formation process by using the various units.

Paper Supply Process (S002): The paper supply process is a process for supplying paper to be printed into the printer and positioning the paper at a print start position (also referred to as "indexed position"). The controller 60 positions the paper at the print start position by rotating the paper supply roller 21 and the carry roller 23.

Dot Formation Process (S003): The dot formation process is a process for forming dots on the paper by ejecting ink intermittently from the head 41 that moves in the movement direction. The controller 60 moves the carriage 31 in the movement direction by driving the carriage motor 32, and then, while the carriage 31 is moving, causes the head 41 to eject ink in accordance with pixel data contained in the print data. Dots are formed on the paper when ink droplets ejected from the head 41 land on the paper. Since ink is intermittently ejected from the head 41 that is moving, dot rows (raster lines) consisting of a plurality of dots in the movement direction are formed on the paper.

Carrying Process (S004): The carrying process is a process for moving the paper relative to the head in the carrying direction. The controller 60 carries the paper in the carrying direction by rotating the carry roller 23. Due to this carrying process, the head 41 can form dots at positions that are different from the positions of the dots formed in the preceding dot formation process, in the next dot formation process.

Paper Discharge Determination (S005): The controller 60 determines whether or not to discharge the paper being printed. The paper is not discharged if there remains data to be printed on the paper being printed. The controller 60 gradually prints an image consisting of dots on the paper by repeating alternately the dot formation process and carrying process until there is no more data to be printed.

Paper Discharge Process (S006): When there is no more data to be printed on the paper being printed, the controller 60 discharges the paper by rotating the paper discharge roller. It should be noted that whether or not to discharge the paper can also be determined based on a paper discharge command included in the print data.

Print Ending Determination (S007): Next, the controller 60 determines whether or not to continue printing. If a next sheet of paper is to be printed, then printing is continued and the paper supply process for the next paper starts. If the next sheet of paper is not to be printed, then the printing operation is terminated.

Regarding Formation of Raster Lines

First, regular printing is described. The regular printing of the present embodiment is carried out using a printing method referred to as interlaced printing. Here, "interlaced printing" means a printing scheme in which, raster lines that are not recorded are sandwiched between raster lines that are recorded in one pass. A "pass" refers to one dot formation process, and "pass n" refers to the nth dot formation process. A "raster line" refers to a row of dots lined up in the movement direction and is also referred to as "dot line".

Figure 7A:
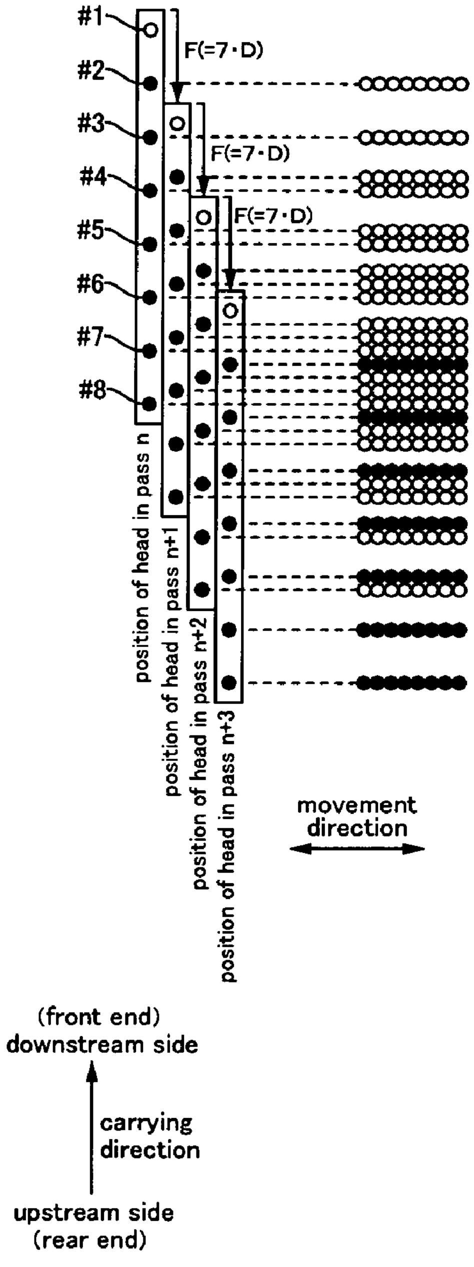
FIGS. 7A and 7B are explanatory diagrams of regular printing.
Figure 7B:
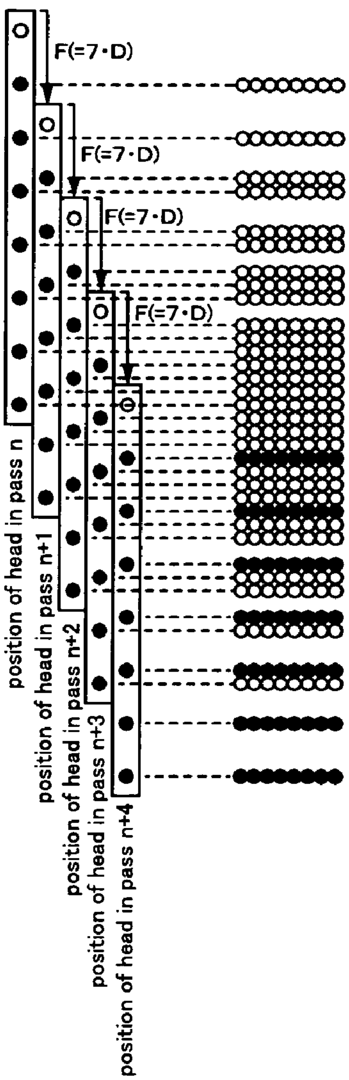

FIGS. 7A and 7B are explanatory diagrams of regular printing. FIG. 7A shows positions of the head and how dots are formed in each of the pass n through pass n+3, and FIG. 7B shows positions of the head and how dots are formed in each of the pass n through pass n+4.

It should be noted that, for convenience's sake, only one of a plurality of the nozzle groups is shown and the number of nozzles of each nozzle group is reduced. In addition, the head 41 (and the nozzle groups) is illustrated as if it is moving with respect to the paper, but the figures merely show the relative positional relationship between the head 41 and the paper, and in reality, the paper moves in the carrying direction. Furthermore, for convenience of explanation, each nozzle is illustrated as if it forms only a few dots (circles in the figure), but in reality, there are numerous dots lined up in the movement direction (this row of dots is the raster line) because ink droplets are intermittently ejected from the nozzles that move in the movement direction. As a matter of course, there are cases in which a dot is not formed depending on the pixel data. In the figure, a nozzle shown with a filled circle is a nozzle that is allowed to eject ink and a nozzle shown with a white circle is a nozzle that is not allowed to eject ink. Furthermore, in the figure, a dot shown with a filled circle is a dot that is formed in the last pass and a dot shown with a white circle is a dot that is formed in other passes therebefore.

In this interlaced printing, every time the paper is carried in the carrying direction by a constant carry amount F, each nozzle records a raster line immediately above another raster line that was recorded in the immediately prior pass. In order to carry out recording with a constant carry amount in this way, it is required (1) that the number N (integer) of nozzles that are allowed to eject ink is coprime to k and (2) that the carry amount F is set to N·D. Here, N=7, k=4, and F=7·D (D=1/720 inch).

However, there is a region in which raster lines can not be formed continuously in the carrying direction in case of using only this regular printing. Therefore, printing methods which are respectively referred to as front-end printing and rear-end printing are carried out respectively before or after the regular printing.

Figure 8:
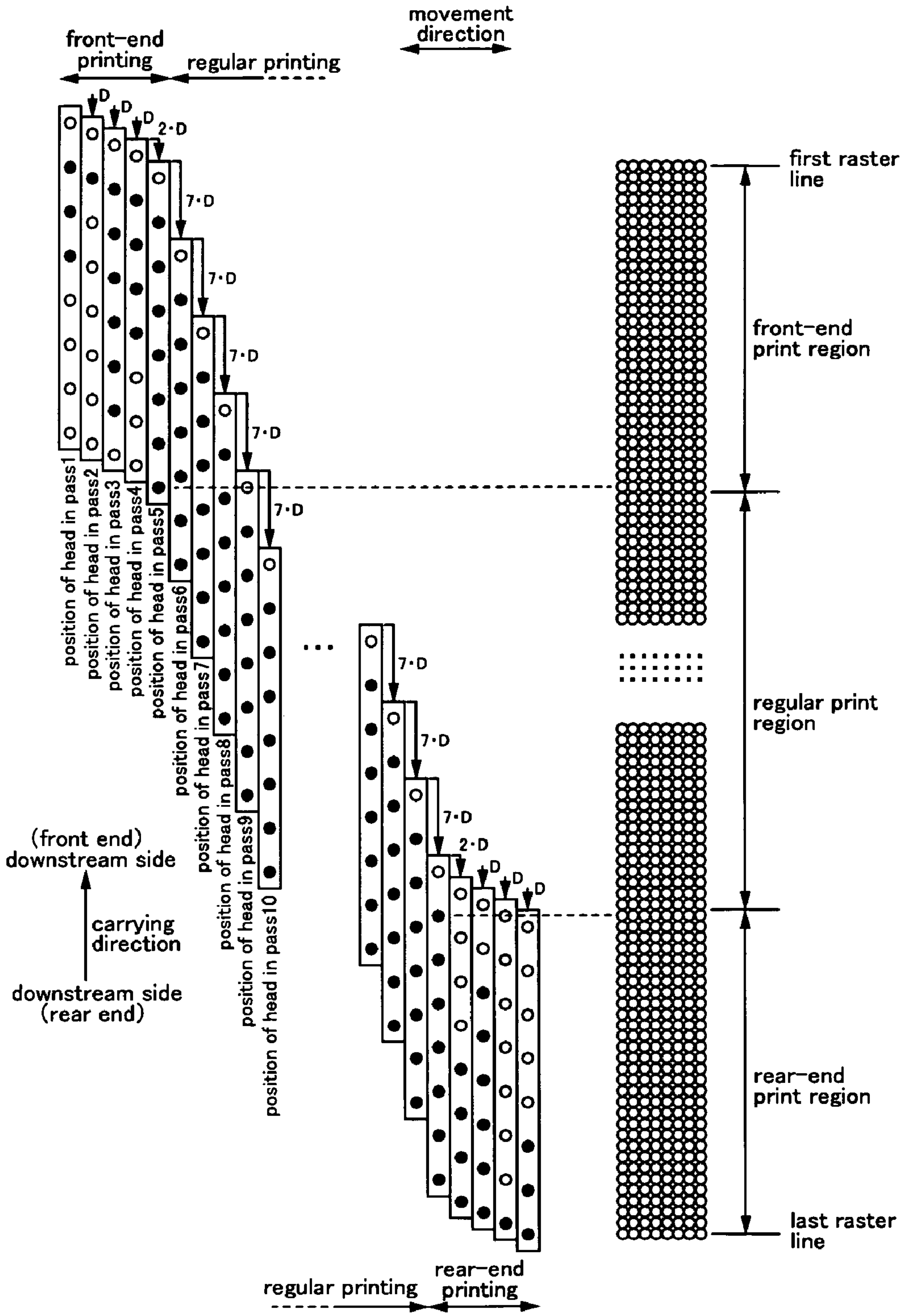
FIG. 8 is an explanatory diagram of front-end printing and rear-end printing.

FIG. 8 is an explanatory diagram of the front-end printing and rear-end printing. The first five passes correspond to the front-end printing, and the last five passes correspond to the rear-end printing.

In the front-end printing, at the time when a part near the front end of the print image is printed, the paper is carried by a smaller carry amount (1·D or 2·D) than the carry amount in the regular printing (7·D). Also, in the front-end printing, the nozzles that eject ink are not fixed. In the rear-end printing, in the same way as the front-end printing, at the time when a part near the rear end of the print image is printed, the paper is carried by a smaller carry amount (1·D or 2·D) than the carry amount in the regular printing (7·D). Also, in the rear-end printing, in the same way as the front-end printing, the nozzles that eject ink are not fixed. In this way, a plurality of raster lines lined up continuously in the carrying direction can be formed between the first raster line and the last raster line.

A region in which raster lines are formed solely by the regular printing is referred to as a "regular print region". A region which is located on the front-end side of the paper (the downstream side in the carrying direction) with respect to the regular print region is referred to as a "front-end print region". A region which is located on the rear-end side of the paper (the upstream side in the carrying direction) with respect to the regular print region is referred to as a "rear-end print region". In the front-end print region, thirty raster lines are formed. Also, in the rear-end print region, thirty raster lines are formed. In the regular print region, thousands of raster lines are formed, depending on the size of the paper.

In the regular print region, there is regularity, for each set of raster lines of a number corresponding to the carry amount (seven in this example), in how the raster lines are arranged. The raster lines from the first one through the seventh one located in the regular print region shown in FIG. 8 are formed respectively by nozzle #3, nozzle #5, nozzle #7, nozzle #2, nozzle #4, nozzle #6, and nozzle #8, and the seven raster lines following the seventh raster line are formed respectively by the nozzles in the same order as mentioned above. On the other hand, in the front-end print region and rear-end print region, there is no simple regularity in how the raster lines are arranged in comparison with the raster lines in the regular print region.

Outline of Correction for Unevenness in Density

Regarding Unevenness in Density (Banding)

In this section, for convenience of explanation, a cause of unevenness in density that occurs in an image printed with monochrome printing is described. In case of multi-color printing, the cause of unevenness in density described below occurs for each color.

In the explanation below, a "unit region" means a virtual rectangular region determined on a medium such as paper, the size and shape of which are determined depending on print resolution. For example, in case that the print resolution is specified as 720 dpi (in the movement direction)×720 dpi (in the carrying direction), a unit region is a square region approximately 35.28 μm long and 35.28 μm wide (≈1/720 inch×1/720 inch). In case that the print resolution is specified as 360 dpi×720 dpi, a unit region is a rectangular region approximately 70.56 μm long and 35.28 μm wide (≈1/360 inch×1/720 inch). If an ink droplet is ideally ejected, the ink droplet lands in the center of this unit region, then the ink droplet spreads on the medium, and a dot is formed in the unit region. One unit region corresponds to one of pixels which image data consists of. Since each unit region corresponds to each pixel, pixel data of each pixel also corresponds to each unit region.

Furthermore, in the explanation below, a "row region" means a region consisting of a plurality of unit regions lined up in the movement direction. For example, in case that the print resolution is specified as 720 dpi×720 dpi, a row region is a belt-like region having a width of 35.28 μm (≈1/720 inch) in the carrying direction. If ink droplets are ideally ejected intermittently from a nozzle moving in the movement direction, a raster line is formed in this row region. One row region corresponds to a plurality of pixels lined up in the movement direction.

Figure 9A:
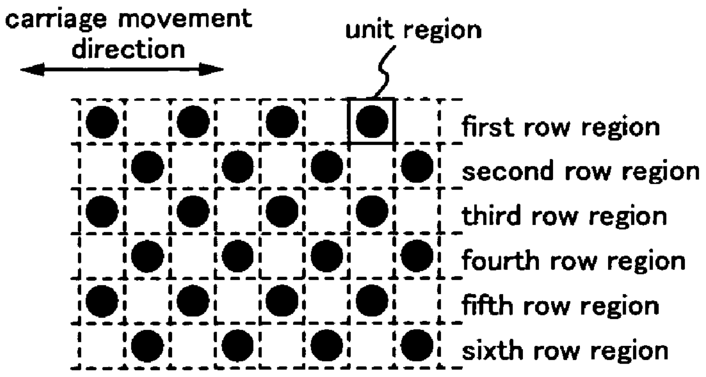
FIG. 9A is an explanatory diagram showing a state in which dots are formed ideally.

FIG. 9A is an explanatory diagram showing a state in which dots are formed ideally. In the figure, since dots are formed ideally, each dot is formed precisely in the unit region and each raster line is formed precisely in the row region. Each row region is illustrated in the figure as a region sandwiched by dotted lines, and in this case, is a region 1/720 inch wide. In each row region, apiece of image which has a density equivalent to coloring of the region is formed. Here, for convenience of explanation, an image which has a constant density in order to fix the dot-generation rate at 50% is printed.

Figure 9B:
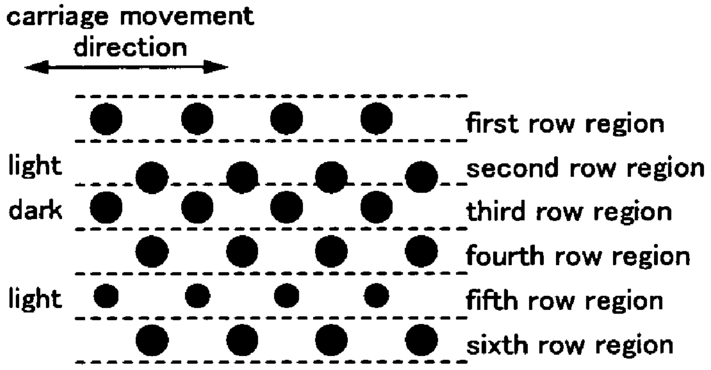
FIG. 9B is an explanatory diagram showing how the variation in precision of manufacturing among nozzles affects dot formation.

FIG. 9B is an explanatory diagram showing how the variation in precision of manufacturing among nozzles affects dot formation. Here, the raster line formed in the second row region is formed closer to the side of the third row region (the upstream side in the carrying direction) because of variations in the flying direction of ink droplets ejected from nozzles. Also, since ink of ink droplets ejected to the fifth row region is less in amount, dots formed in the fifth row region are smaller in size. Despite that, by definition, pieces of image having the same density should be formed in each row region, a variation in density occurs among pieces of image depending on row regions in which they are formed because of the variation in precision of manufacturing. For example, the piece of image in the second row region is formed relatively light in color, and the piece of image in the third row region relatively dark in color. The piece of image in the fifth row region is formed relatively light in color.

Accordingly, in case of observing macroscopically a print image consisting of such raster lines, a streaky unevenness in density in the movement direction of the carriage is visually noticeable. This unevenness in density makes print image quality deteriorate.

Figure 9C:
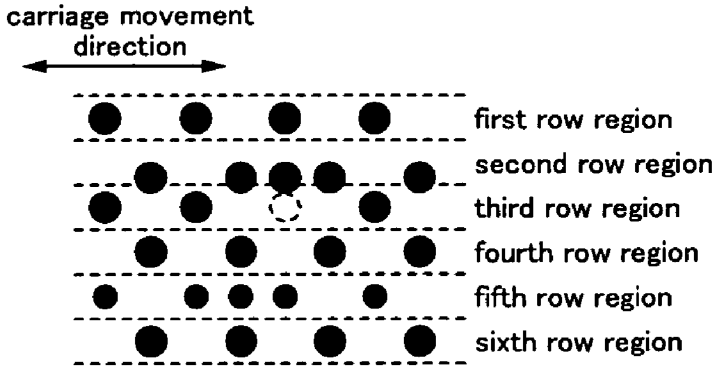
FIG. 9C is an explanatory diagram showing how dots are formed by the printing method of the present embodiment.

FIG. 9C is an explanatory diagram showing how dots are formed by the printing method of the present embodiment. In the present embodiment, for row regions which tend to be visually perceived darker in color, tone values of pixel data (CMYK pixel data) of pixels corresponding to the row regions are corrected in order to form pieces of image lighter in color. Also, for row regions which tend to be visually perceived lighter in color, tone values of pixel data of pixels corresponding to the row regions are corrected in order to form pieces of image darker in color. For example, in the figure, tone values of pixel data of the pixels corresponding to each row region are corrected in order to increase the generation rate of dots in the second row region, to decrease the generation rate of dots in the third row region, and to increase the generation rate of dots in the fifth row region. Thereby, the dot-generation rate of the raster line corresponding to each row region is changed, the density of the piece of image in the row region is corrected, and thus unevenness in density in the entire print image is suppressed.

Furthermore, in FIG. 9B, the piece of image formed in the third row region is darker in color, not because of effects of the nozzle that forms the raster line in the third row region, but because of effects of the nozzle that forms the raster line in the second row region contiguous thereto. Accordingly, if the nozzle that forms the raster line in the third row region forms a raster line in another row region, a piece of image formed in the other row region is not always darker in color. In short, there are cases in which there is difference in density of color even among pieces of image formed by the same nozzle if pieces of image contiguous to each of the above-mentioned pieces are formed respectively by different nozzles. In this case, correction values corresponding only to each nozzle cannot suppress unevenness in density. Thus, in the present embodiment, tone values of pixel data are corrected based on the correction values set for each row region.

Therefore, in the present embodiment, on an inspection process at a printer manufacturing plant, a printer prints a correction pattern, the correction pattern is read with a scanner, and a correction value corresponding to each row region, which is based on density of each row region in the correction pattern, is stored in a memory of the printer. The correction values stored in the printer reflects characteristics of unevenness in density of each individual printer.

Then, under instructions by a user who has purchased the printer, the printer driver reads the correction values from the printer, tone values of pixel data are corrected based on the correction values, print data is generated based on the corrected tone values, and the printer performs printing based on the print data.

Regarding Process at Printer Manufacturing Plant

Figure 10:
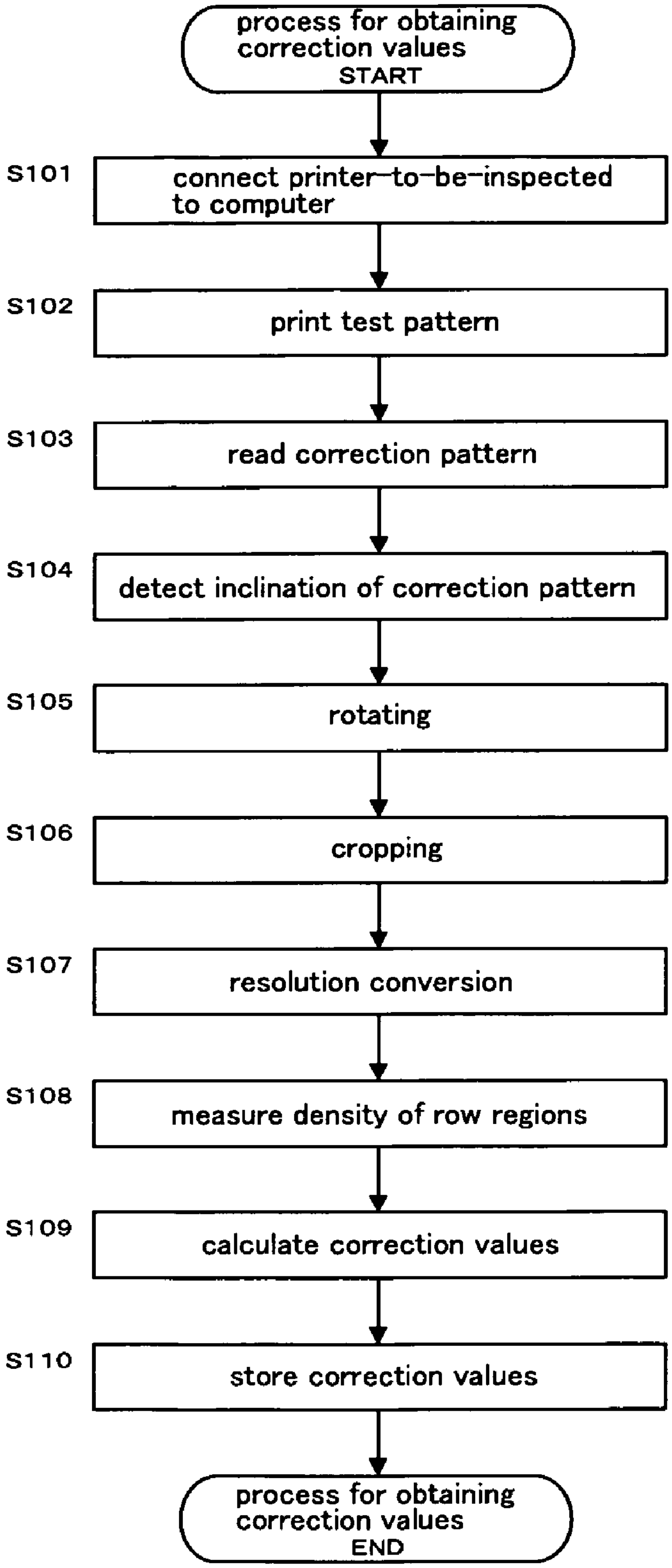
FIG. 10 is a flowchart showing a process for obtaining correction values, which is performed on an inspection process after a printer has been manufactured.

FIG. 10 is a flowchart showing a process for obtaining correction values, which is performed on an inspection process after a printer has been manufactured.

First, an inspector connects a printer 1 to be inspected to a computer 110 in a plant (S101). The computer 110 in the plant is also connected to a scanner 150, and has computer programs installed thereon, such as a printer driver for having the printer 1 print a test pattern, a scanner driver for controlling the scanner 150, and a program for obtaining correction values which is for carrying out image processing, analysis, or otherwise, of image data of correction patterns read by the scanner.

Second, the printer driver installed on the computer 110 causes the printer 1 to print the test pattern (S102).

Figure 11:
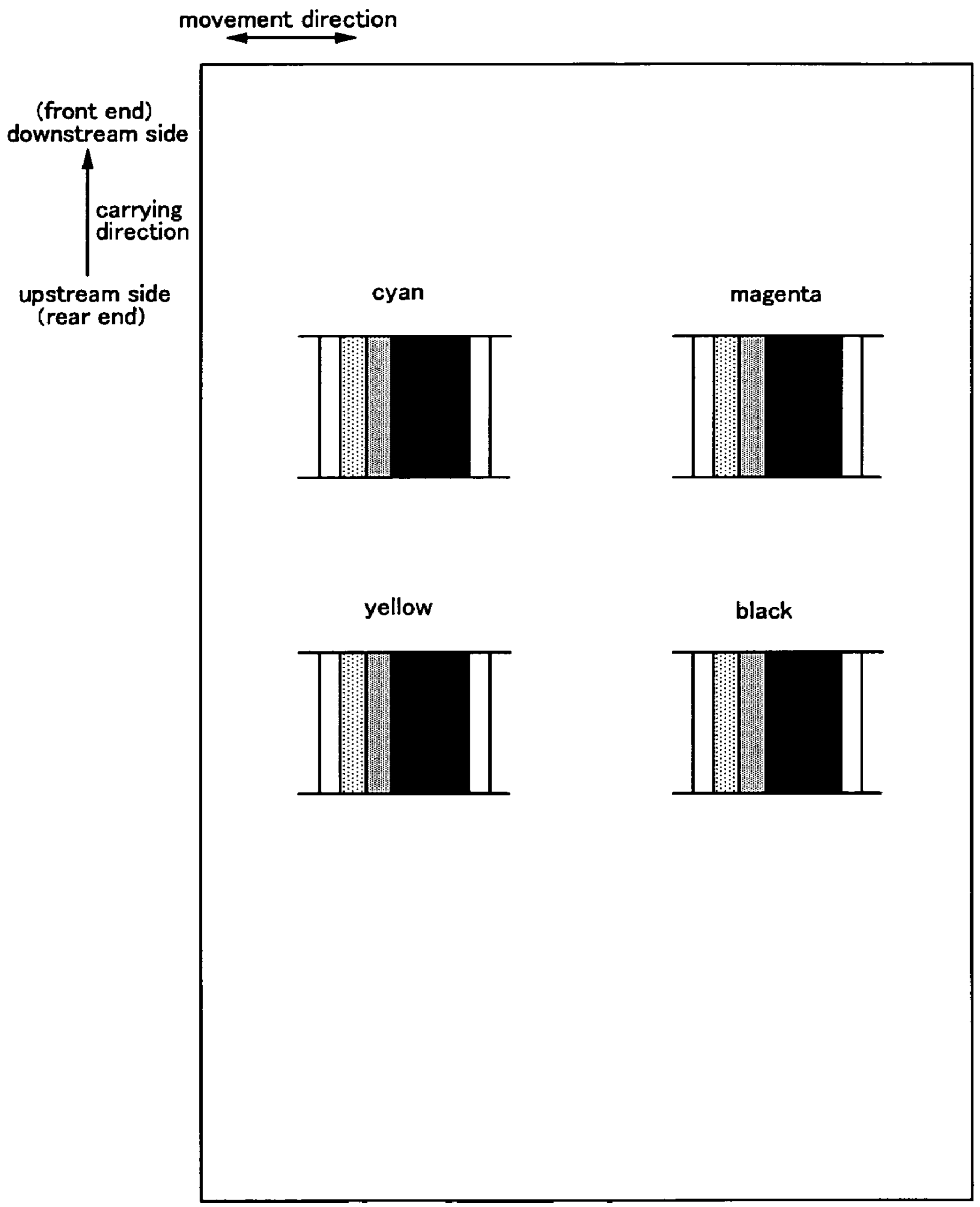
FIG. 11 is an explanatory diagram showing a test pattern.
Figure 12:
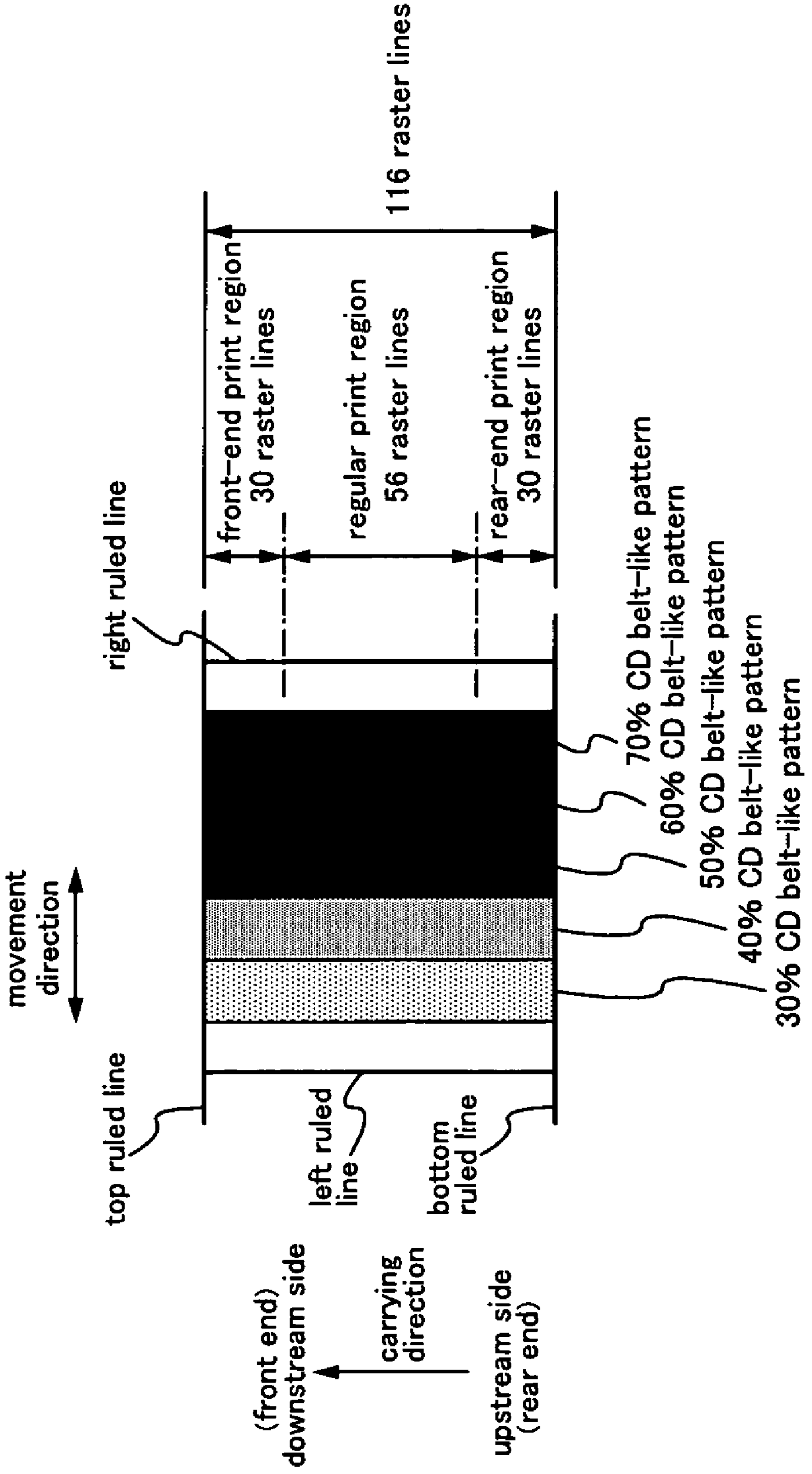
FIG. 12 is an explanatory diagram showing a correction pattern.

FIG. 11 is an explanatory diagram showing the test pattern. FIG. 12 is an explanatory diagram showing the correction pattern. In the test pattern, four correction patterns different in color are formed. Each correction pattern consists of five belt-like patterns different in color density (CD), one top ruled line, one bottom ruled line, one left ruled line, and one right ruled line. Each of the belt-like patterns is generated respectively from image data having a specific tone value, which is respectively 76 (30% CD), 102 (40% CD), 128 (50% CD), 153 (60% CD) and 179 (70% CD) in the order shown from left to right and becomes darker as the belt-like pattern is located toward the right. These five tone values (color densities) are referred to as the "designated tone values (the designated color-densities)" and are represented with the respective symbols: Sa (=76), Sb (=102), Sc (=128), Sd (=153), and Se (=179). Each belt-like pattern is formed by front-end printing, regular printing and rear-end printing, and consists of raster lines in a front-end print region, raster lines in a regular print region, and raster lines in a rear-end print region. On printing of the correction pattern, raster lines the number of which is equivalent to eight cycles are formed in the regular print region though thousands of raster lines are formed in the regular print region in usual printing. Here, for convenience of explanation, the correction patterns are printed by the printing described in FIG. 8, and each belt-like pattern consists of 116 raster lines in total: thirty raster lines in the front-end print region, fifty-six raster lines (seven raster lines in each cycle×eight cycles) in the regular print region, and thirty raster lines in the rear-end print region. The top ruled line is formed with the first one of raster lines which the belt-like pattern consists of (the raster line on the most downstream side in the carrying direction). The bottom ruled line is formed with the last one of raster lines which the belt-like pattern consists of (the raster line on the most upstream side in the carrying direction).

Next, the inspector sets the test pattern printed with the printer 1 on the scanner 150 by placing the test pattern on a document platen glass 152 of the scanner 150 and lowering a lid 151. Then, the scanner driver installed on the computer 110 causes the scanner 150 to read the correction patterns (S103). The section below describes how the correction pattern of cyan is read (the correction patterns of other colors are read in the same way).

Figure 13:
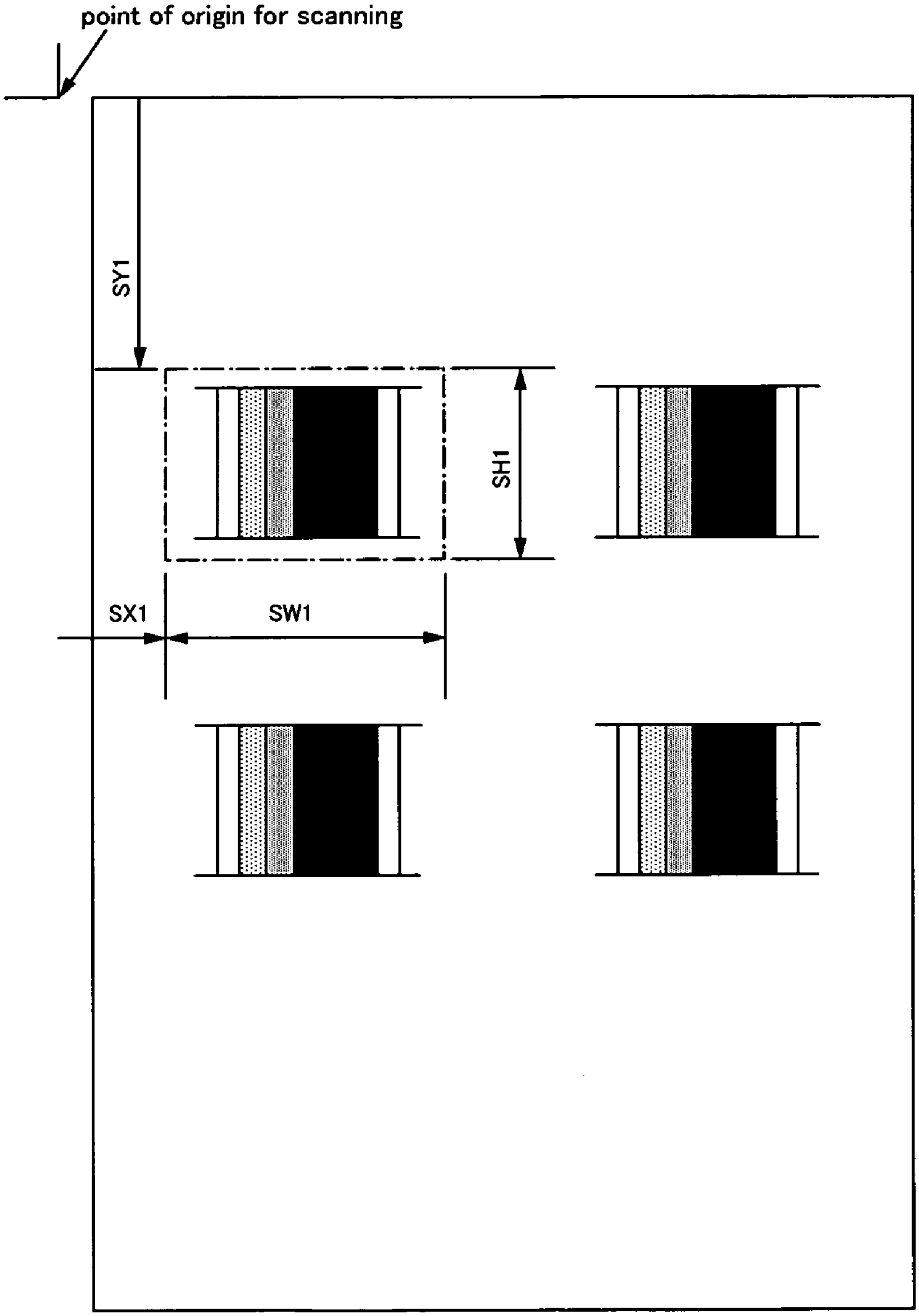
FIG. 13 is an explanatory diagram showing a reading range of a correction pattern of cyan.

FIG. 13 is an explanatory diagram showing a reading range of the correction pattern of cyan. The range within dot dash lines surrounding the correction pattern of cyan is a reading range when the correction pattern of cyan is read. Parameters SX1, SY1, SW1 and SH1, which are for specifying this reading range, are preset on the scanner driver by the program for obtaining correction values. In case that this reading range is read by the scanner 150, the entire correction pattern of cyan can be read even if the test pattern is placed slightly out of position on the scanner 150. By this process, an image in the reading range in the figure is read by the computer 110 as rectangular image data with resolution of 2880×2880 dpi.

Figure 14A:
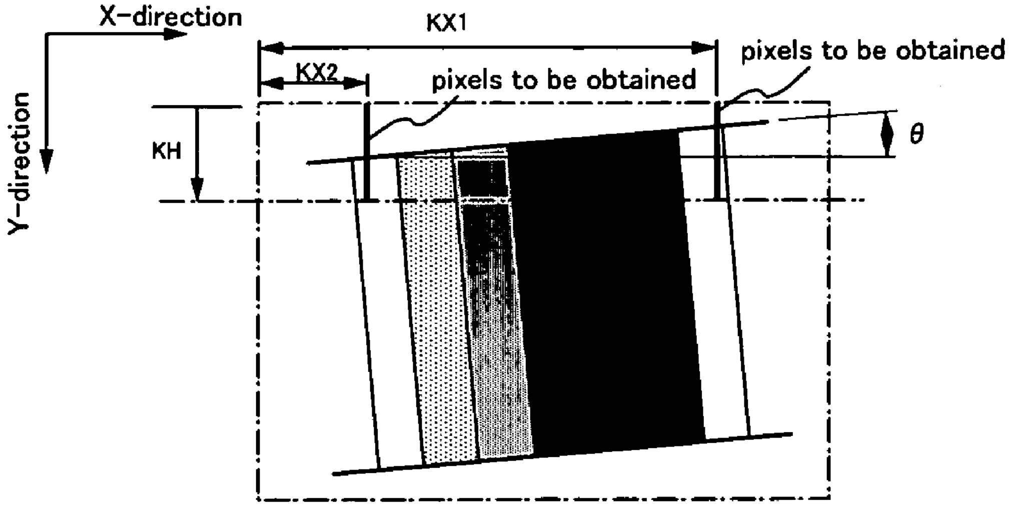
FIG. 14A is an explanatory diagram showing image data on detection of an inclination.
Figure 14B:
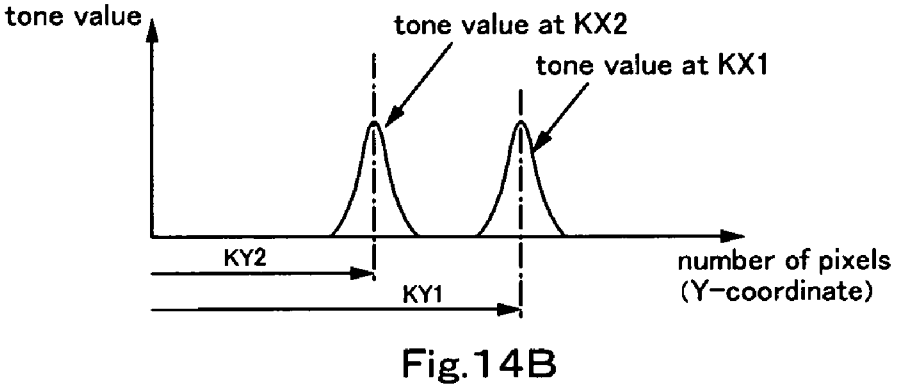
FIG. 14B is an explanatory diagram showing how the location of a top ruled line is detected.
Figure 14C:
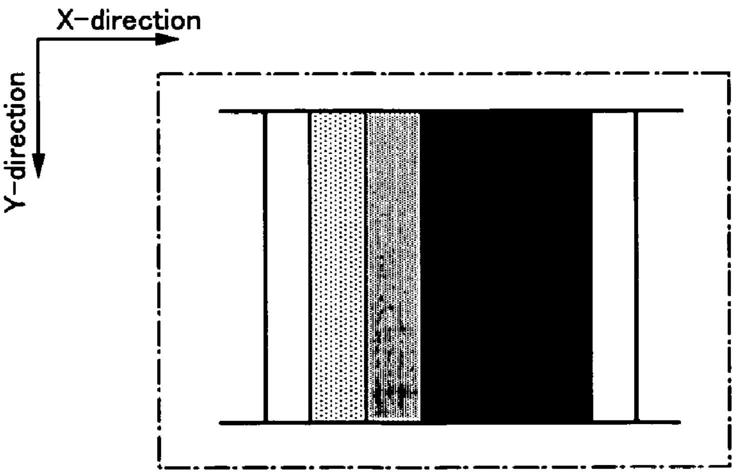
FIG. 14C is an explanatory diagram showing rotated image data.

Next, the program for obtaining correction values installed on the computer 110 detects an inclination θ of the correction pattern in the image data (S104), and rotates the image data depending on the inclination θ (S105). FIG. 14A is an explanatory diagram showing the image data on detection of the inclination. FIG. 14B is an explanatory diagram showing how the location of the top ruled line is detected. FIG. 14C is an explanatory diagram showing the rotated image data. The program for obtaining correction values obtains from the read image data pixel data of KH pieces of pixels from the top which are located KX1*th* from the left and pixel data of KH pieces of pixels from the top which are located KX2*th* from the left. The parameters KX1, KX2, and KH are preset in order for pixels obtained as mentioned above to include the top ruled line and to exclude the right ruled line and the left ruled line. In order to detect the location of the top ruled line, the program for obtaining correction values obtains respective barycentric positions of the tone values of the KH pieces of pixel data obtained: KY1 and KY2. The program for obtaining correction values calculates by the following formula the inclination θ of the correction pattern based on the parameters KX1 and KX2 and the barycentric positions KY1 and KY2, and rotates the image data based on the inclination θ calculated:

$$\theta=\tan^{-1}\{(KY2-KY1)/(KX2-KX1)\}$$

Figure 15A:
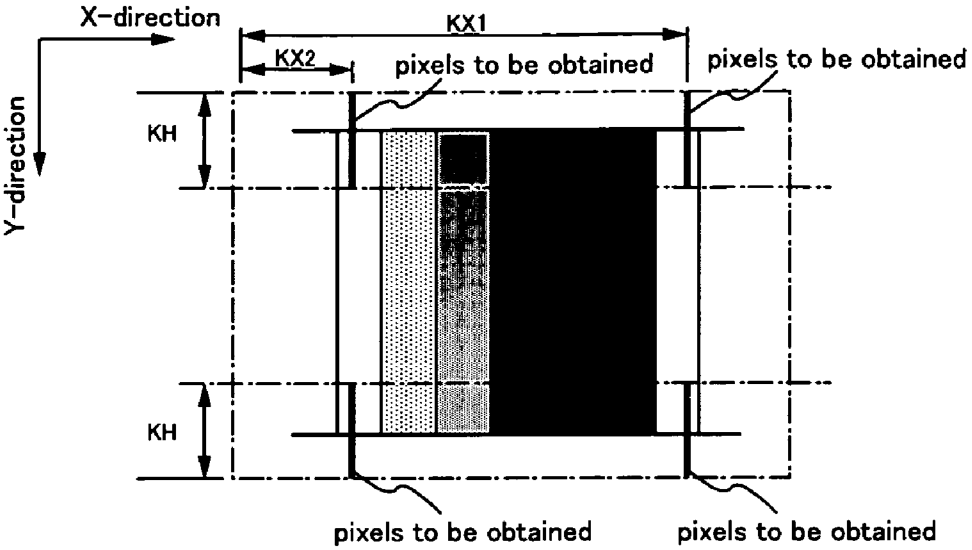
FIG. 15A is an explanatory diagram showing image data on cropping.
Figure 15B:
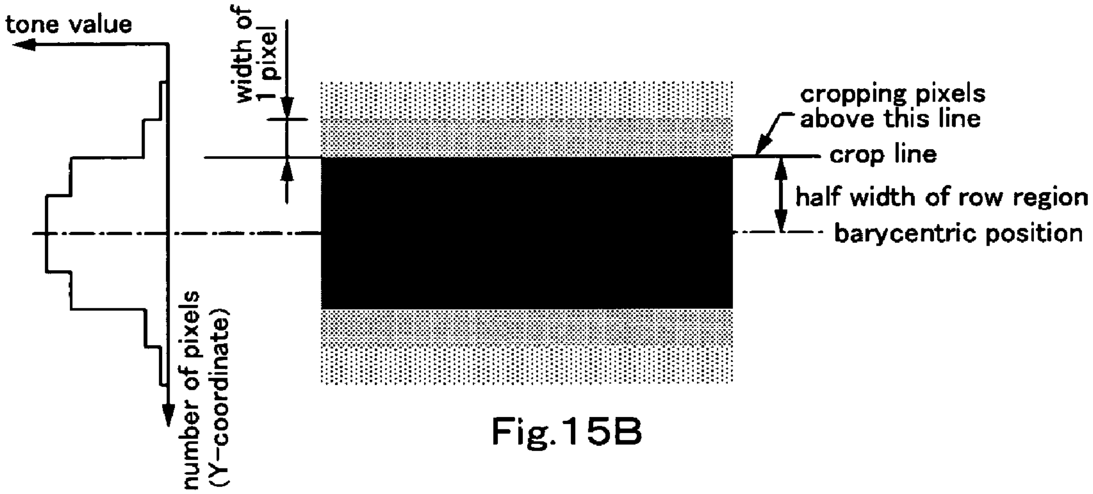
FIG. 15B is an explanatory diagram showing a crop line with respect to a top ruled line.
Figure 15C:
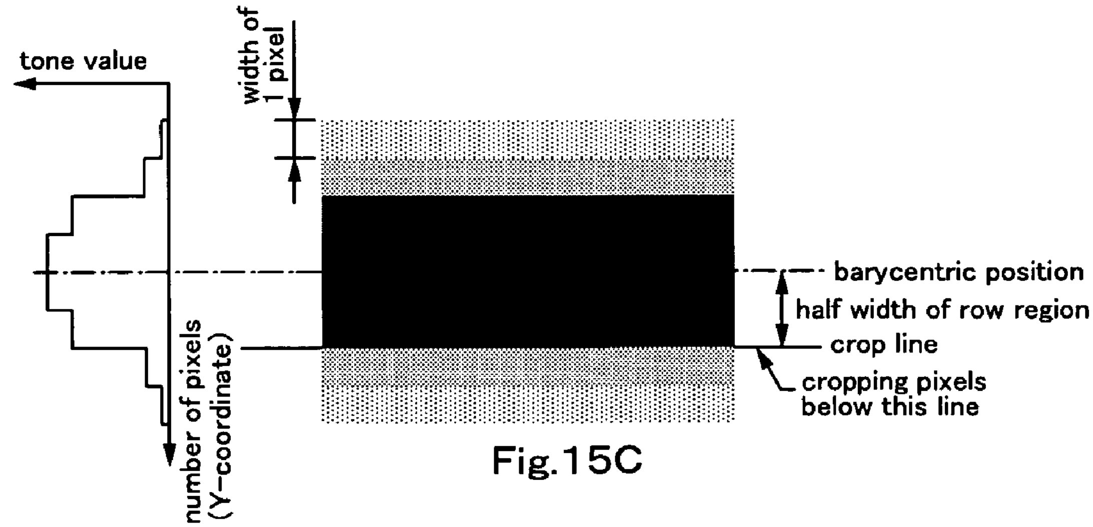
FIG. 15C is an explanatory diagram showing a crop line with respect to a bottom ruled line.

Next, the program for obtaining correction values installed on the computer 110 crops the image data in order to eliminate unnecessary pixels (S106). FIG. 15A is an explanatory diagram showing the image data on cropping. FIG. 15B is an explanatory diagram showing a crop line with respect to the top ruled line. In the same way as processed in S104, the program for obtaining correction values obtains from the rotated image data pixel data of KH pieces of pixels from the top which are located KX1*th* from the left and pixel data of KH pieces of pixels from the top which are located KX2*th* from the left. In order to detect the location of the top ruled line, the program for obtaining correction values obtains respective barycentric positions of the tone values of the KH pieces of pixel data obtained, KY1 and KY2, and calculates an average value of the two barycentric positions. A border of pixels nearest to the position half width of a row region above the barycentric position is determined as a crop line. In the present embodiment, since the resolution of the image data is 2880 dpi and the width of the row region is 1/720 inch, the half width of the row region is equivalent to two pixels. The program for obtaining correction values crops pixels above the determined crop line. FIG. 15C is an explanatory diagram showing a crop line with respect to the bottom ruled line. In substantially the same way as the top ruled line, the program for obtaining correction values obtains from the rotated image data pixel data of KH pieces of pixels from the bottom which are located KX1*th* from the left and pixel data of KH pieces of pixels from the bottom which are located KX2*th* from the left, and calculates the barycentric position of the bottom ruled line. A border of pixels nearest to the position half width of a row region below the barycentric position is determined as a crop line. The program for obtaining correction values crops pixels below the crop line.

Figure 16:
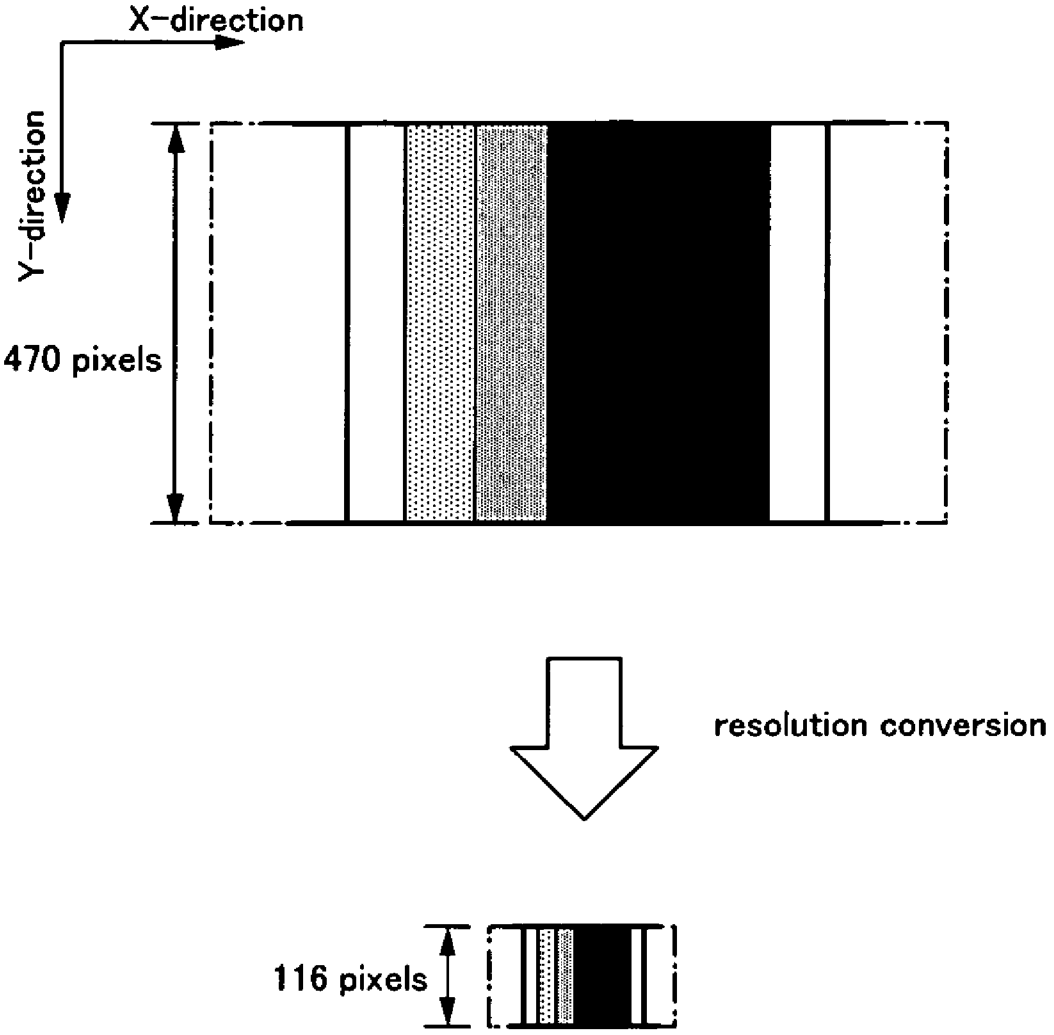
FIG. 16 is an explanatory diagram showing how to convert resolution.

Next, the program for obtaining correction values installed on the computer 110 converts the resolution of the cropped image data in order to make the number of pixels in Y-direction equal to 116 (same as the number of raster lines which the correction pattern consists of) (S107). FIG. 16 is an explanatory diagram showing how to convert resolution. In case that the printer 1 forms ideally the correction pattern consisting of 116 raster lines with resolution of 720 dpi, if the scanner 150 reads the correction pattern ideally with resolution of 2880 dpi (with four times as high resolution as the correction pattern), the number of pixels in Y-direction of the cropped image data should be 464 (=116×4). However, actually, by effects of displacement caused when the image data is printed or read, there are cases in which the number of pixels in Y-direction of the image data is not 464. Here, the number of pixels in Y-direction of the cropped image data is 470. The program for obtaining correction values installed on the computer 110 converts resolution of the image data (performs a shrinkage process), at the rate of 116/470 (="the number of raster lines which the correction pattern consists of"/"the number of pixels in Y-direction of the cropped image data"). Here, resolution is converted using the bicubic interpolation method. As a result thereof, the number of pixels in Y-direction of the image data after resolution conversion is 116. In other words, the image data of the correction pattern with resolution of 2880 dpi is converted into the image data of the correction pattern with resolution of 720 dpi. This conversion makes the number of pixels lined up in Y-direction equal to the number of row regions, and one row of pixels in X-direction corresponds to one row region on a one-to-one basis. For example, the row of pixels in X-direction located in the top corresponds to the first row region, and the row of pixels located immediately below the above-mentioned row corresponds to the second row region. Since this resolution conversion aims to make the number of pixels in Y-direction equal to 116, resolution conversion in X-direction (shrinkage process) does not necessary have to be performed.

Next, the program for obtaining correction values installed on the computer 110 measures respective densities of the five belt-like patterns in each row region (S108). The section below describes measurement of density of the leftmost belt-like pattern in the first row region formed with 76 (30% CD) in tone value (measurement of density of the other row regions in that belt-like pattern, as well as measurement of density of the other belt-like patterns in the first or other row regions, are performed in the same way).

Figure 17A:
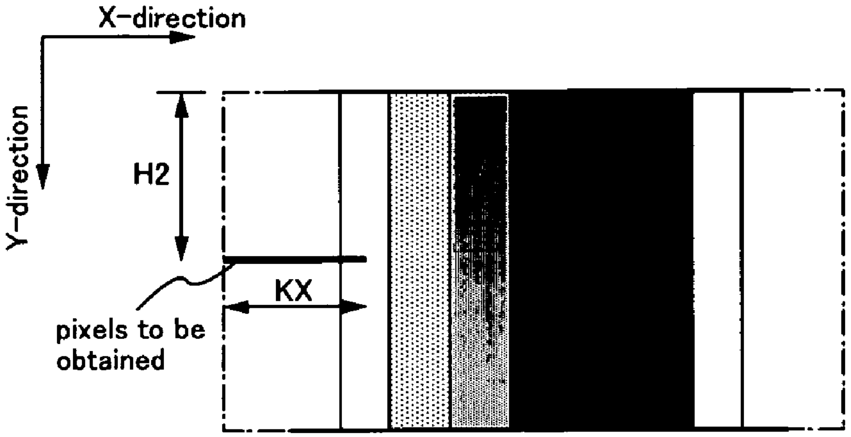
FIG. 17A is an explanatory diagram showing image data when a left ruled line is detected.
Figure 17B:
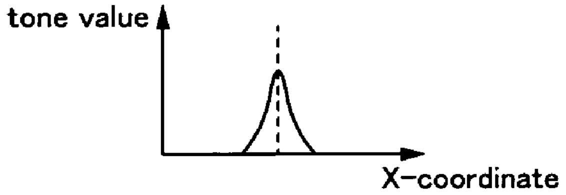
FIG. 17B is an explanatory diagram showing how the location of the left ruled line is detected.
Figure 17C:
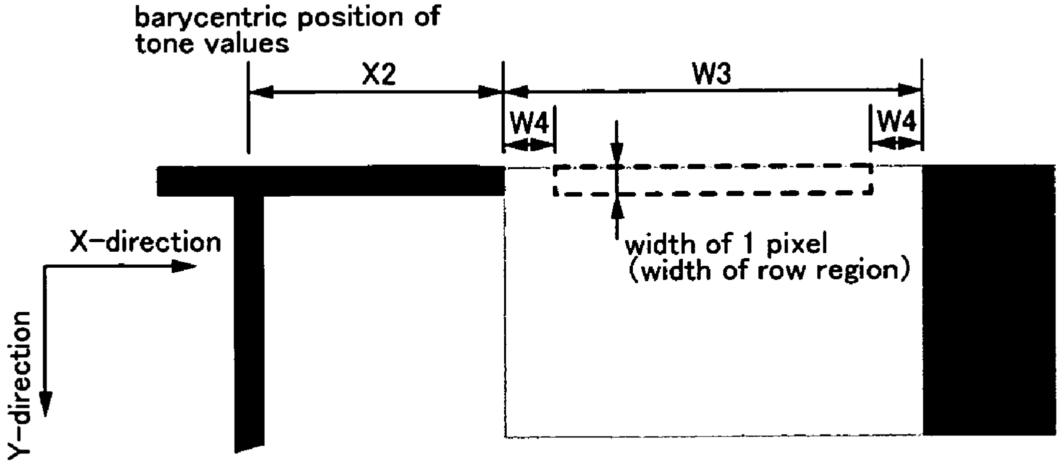
FIG. 17C is an explanatory diagram showing a density-measuring range of a belt-like pattern in the first row region formed with 30% of color density (CD).

FIG. 17A is an explanatory diagram showing the image data when the left ruled line is detected. FIG. 17B is an explanatory diagram showing how the location of the left ruled line is detected. FIG. 17C is an explanatory diagram showing a density-measuring range of the belt-like pattern in the first row region formed with 30% CD. The program for obtaining correction values obtains pixel data of KX pieces of pixels from the left which are located H2_th_ from the top, from the image data whose resolution has been converted. The parameter KX is preset in order for pixels obtained as mentioned above to include the left ruled line. In order to detect the location of the left ruled line, the program for obtaining correction values obtains a barycentric position of tone values of pixel data of the KX pieces of pixels obtained. It is known from the shape of the correction pattern that a W3 wide belt-like pattern formed with 30% CD exists X2 to the right of this barycentric position (the location of the left ruled line). The program for obtaining correction values extracts, taking the barycentric position as a reference, pixel data within a range surrounded by dotted lines, which excludes two W4 wide ranges which are located at respective horizontal ends of and within the belt-like pattern, and an average value of tone values of the pixel data within the range surrounded by the dotted lines is used as a measured value of the first row region with 30% CD. In case of measuring density of the belt-like pattern in the second row region formed with 30% CD, pixel data in a range one-pixel below the range surrounded by the dotted lines in the figure is extracted. In this way, the program for obtaining correction values measures densities of the five belt-like patterns in each row region.

Figures 18, 19:
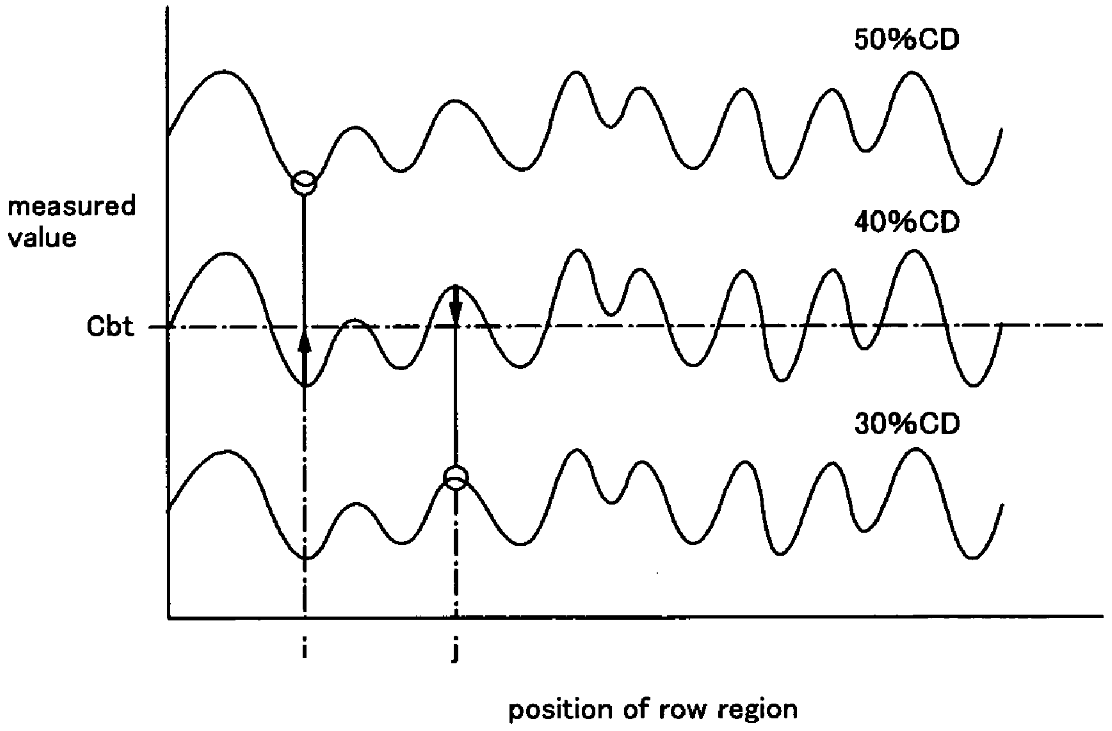
FIG. 18 is a table of values of measured densities of five belt-like patterns of cyan.
FIG. 19 is a graph showing measured values of belt-like patterns of cyan formed with 30%, 40% and 50% CD respectively.

FIG. 18 is a table of values of measured densities of the five belt-like patterns of cyan. In this way, the program for obtaining correction values installed on the computer 110 creates the table of measured values by associating, with each row region, the measured values of densities of the five belt-like patterns. For other colors, tables of measured values are also created. In the explanation below, for a certain row region, measured values in the belt-like patterns with the tone values Sa through Se are represented with respective symbols: Ca through Ce.

FIG. 19 is a graph showing the measured values of the belt-like patterns of cyan formed with 30%, 40% and 50% CD respectively. In each of belt-like patterns, variation in density occurs among row regions despite that the belt-like patterns are formed uniformly with the respective designated tone values. This variation in density among row regions causes unevenness in density of a print image.

In order to eliminate unevenness in density, it is desirable that the measured values are uniform in each belt-like pattern. Accordingly, this section discusses a process for making measured values in a belt-like pattern with tone value Sb (40% CD) uniform. Here, an average measured value Cbt across all row regions of the belt-like pattern with tone value Sb is determined as a target value for 40% CD. In the row region i in which a measured value is lighter in density than this target value Cbt, it is considered only necessary to correct the tone value so that it becomes darker in order for the measured value of density to become closer to the target value Cbt. On the other hand, in the row region j in which a measured value is darker in density than this target value Cbt, it is considered only necessary to correct the tone value so that it becomes lighter in order for the measured value of density to become closer to the target value Cbt.

Figure 20A:
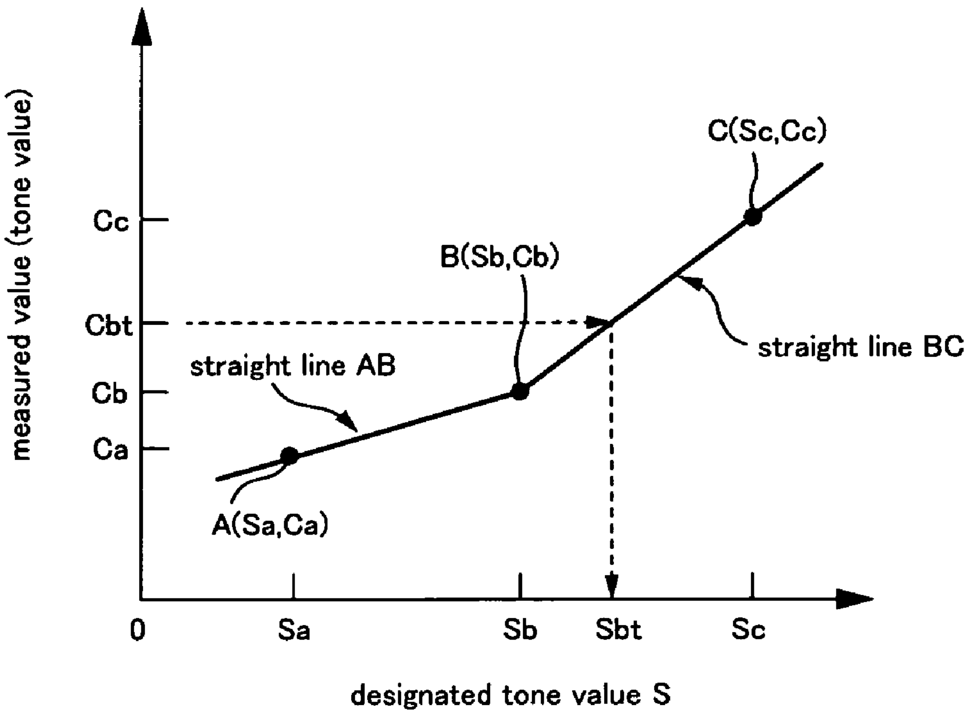
FIG. 20A is an explanatory diagram showing a target designated tone value Sbt of a row region i for a designated tone value Sb.

Therefore, the program for obtaining correction values installed on the computer 110 calculates correction values corresponding to row regions (S109). This section describes how a correction value for the designated tone value Sb of a certain row region is calculated. As described below, a correction value for the designated tone value Sb (40% CD) of the row region i in FIG. 19 is calculated based on measured values of the tone value Sb and tone value Sc (50% CD). On the other hand, a correction value for the designated tone value Sb (40% CD) of row region j is calculated based on measured values of tone value Sb and tone value Sa (30% CD). FIG. 20A is an explanatory diagram showing a target designated tone value Sbt of the row region i for the designated tone value Sb. In this row region, a measured value Cb of density of the belt-like pattern formed with the designated tone value Sb is smaller in tone value than the target value Cbt (in this row region, lighter in color than an average density of the 40% CD belt-like pattern). In case that the printer driver causes the printer to form in this row region a pattern with density of the target value Cbt, it is only necessary to designate the tone value based on the target designated tone value Sbt calculated by the following formula (linear interpolation based on the straight line BC):

$$Sbt=Sb+(Sc-Sb)\times\{(Cbt-Cb)/(Cc-Cb)\}$$

Figure 20B:
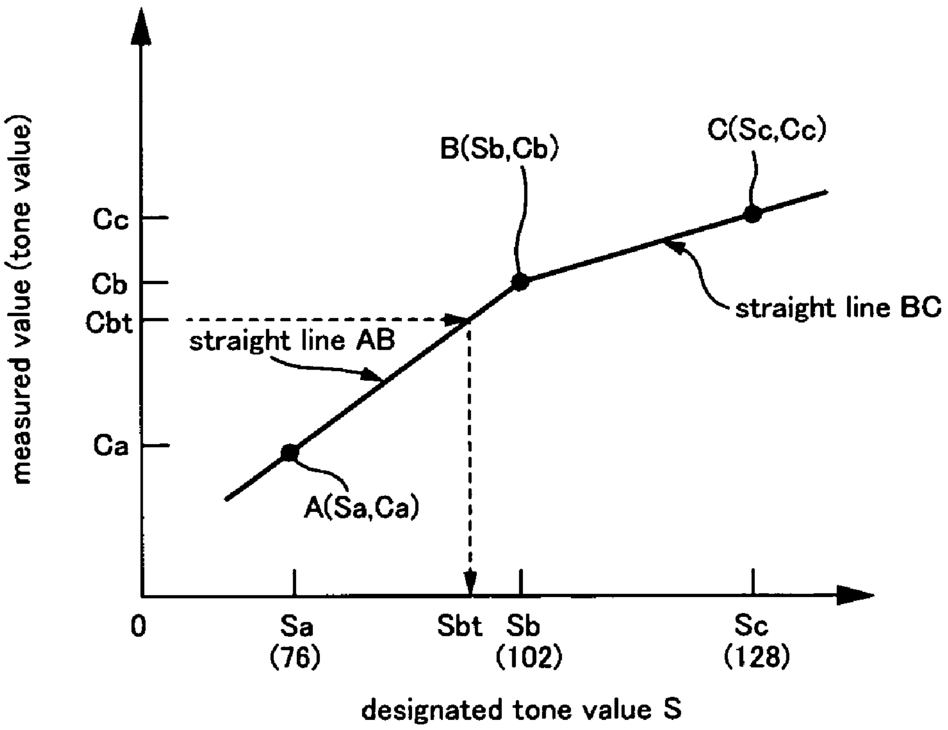
FIG. 20B is an explanatory diagram showing a target designated tone value Sbt of a row region j for a designated tone value Sb.

FIG. 20B is an explanatory diagram showing a target designated tone value Sbt of the row region j for the designated tone value Sb. In this row region, a measured value Cb of density of the belt-like pattern formed with the designated tone value Sb is larger in tone value than the target value Cbt (in this row region, darker in color than an average density of the 40% CD belt-like pattern). In case that the printer driver causes the printer to form in this row region a pattern with density of the target value Cbt, it is only necessary to designate the tone value based on the target designated tone value Sbt calculated by the following formula (linear interpolation based on the straight line AB):

$$Sbt=Sb-(Sb-Sa)\times\{(Cbt-Cb)/(Ca-Cb)\}$$

After calculating the target designated tone value Sbt in this way, the program for obtaining correction values calculates a correction value Hb of this row region for the designated tone value Sb by the following formula:

$$Hb=(Sbt-Sb)/Sb$$

The program for obtaining correction values installed on the computer 110 calculates, for each of the row regions, the correction value Hb for the tone value Sb (40% CD). Also, based on the measured value Cc and the measured value Cb or Cd of each of the row regions, the program for obtaining correction values calculates, for each of the row regions, a correction value Hc for the tone value Sc (50% CD). Also, based on the measured value Cd and the measured value Cc or Ce of the each of the row regions, the program for obtaining correction values calculates, for each of the row regions, a correction value Hd for the tone value Sd (60% CD). Also, for other colors, three correction values (Hb, Hc, and Hd) are calculated for each of the row regions.

There are fifty-six raster lines in the regular print region and there is regularity for every seven raster lines. This regularity is taken into consideration on calculation of the correction values in the regular print region.

When the program for obtaining correction values calculates the correction values of the first row region in the regular print region (the thirty-first row region in the entire print region), the above-mentioned measured value Ca uses the average of the measured values of the following eight row regions in the pattern formed with 30% CD: the first, eighth, fifteenth, twenty-second, twenty-ninth, thirty-sixth, forty-third, and fiftieth ones in the regular print region. Also, when the correction values of the first row region in the regular print region (the thirty-first row region in the entire print region) are calculated, the above-mentioned measured value Cb through Ce uses the respective averages of the measured values of the following eight row regions in the patterns formed with the respective densities: the first, eighth, fifteenth, twenty-second, twenty-ninth, thirty-sixth, forty-third, and fiftieth ones in the regular print region. Based on the measured values Ca through Ce, the correction values (Hb, Hc, and Hd) of the first row region in the regular print region are calculated as mentioned above. In this way, a correction value of a row region in the regular print region is calculated based on an average of measured values of eight row regions, which appear at an interval of every seven regions, in the pattern formed with each density. As a result thereof, in the regular print region, correction values are calculated only for the first though seventh seven row regions, but the correction values are not calculated for the eighth through fifty-sixth row regions. In other words, the correction values for the first though seventh seven row regions in the regular print region also serve as the correction values for the eighth through fifty-sixth row regions.

Next, the program for obtaining correction values installed on the computer 110 stores the correction values in the memory 63 of the printer 1 (S110). FIG. 21 is an explanatory diagram showing a table of correction values of cyan. There are three types of tables of correction values: for the front-end print region, for the regular print region, and for the rear-end print region. In each of the tables of correction values, three correction values (Hb, Hc, and Hd) collectively corresponds to each one of row regions. For example, three correction values (Hb_n, Hc_n, and Hd_n) correspond to the nth row region. The three correction values (Hb_n, Hc_n, and Hd_n) correspond to the respective designated tone values: Sb (=102), Sc (=128) and Sd (=153). Tables of correction values for the other colors are created in the same way.

After the correction values are stored in the memory 63 of the printer 1, the process for obtaining correction values has been completed. Then, the printer 1 is disconnected from the computer 110, and is shipped from the plant after other inspections of the printer 1. A CD-ROM in which the printer driver is stored is packaged with the printer 1.

Regarding Processes under Instructions by User

Figure 22:
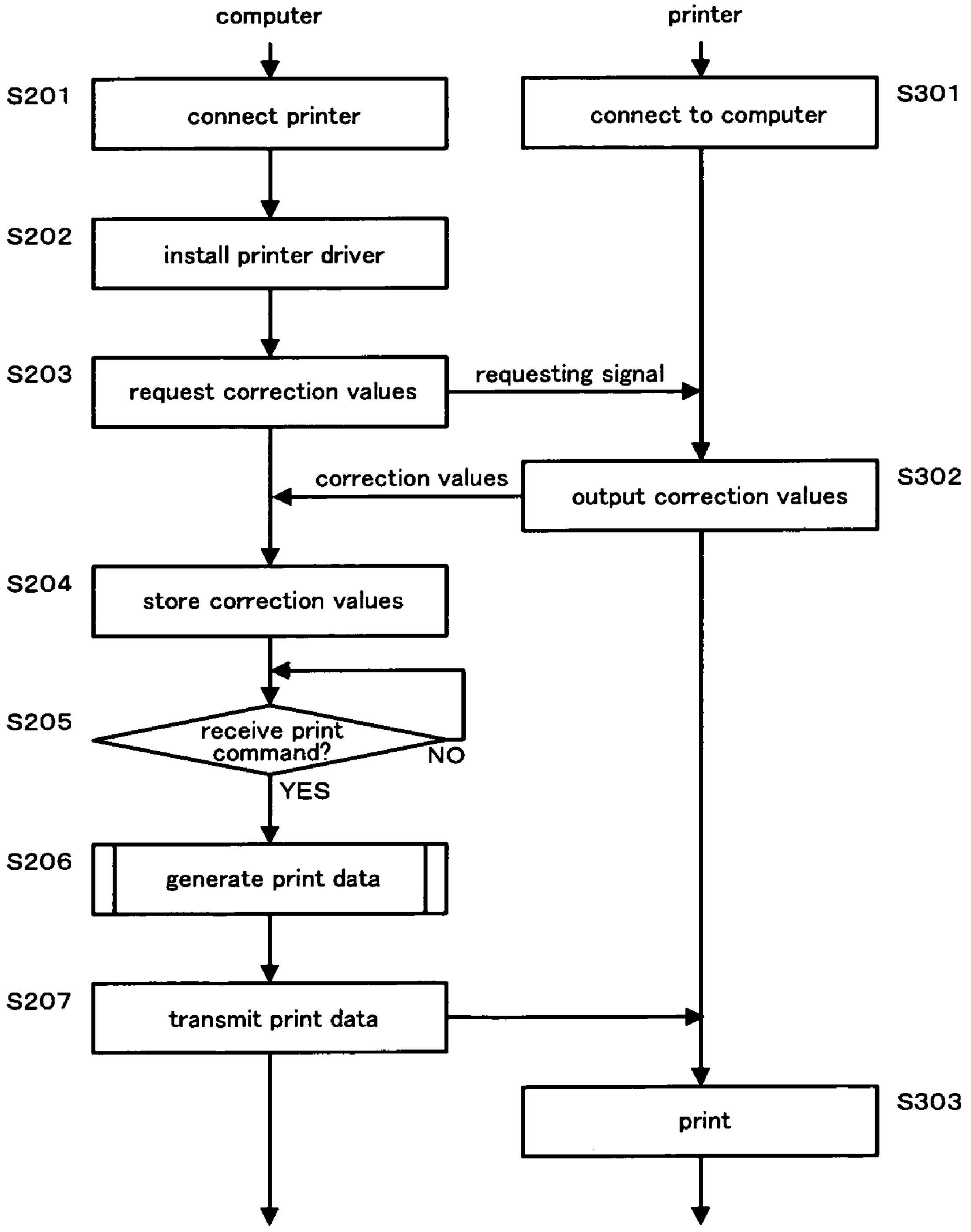
FIG. 22 is a flowchart showing processes under instructions by a user.

FIG. 22 is a flowchart showing processes under instructions by a user. A user who has purchased a printer 1 connects the printer 1 to a computer 110 owned by the user (as a matter of course, a different computer from the computer of the printer manufacturing plant) (S201, S301). The computer 110 of the user is not required to be connected to a scanner 150. Next, the user sets a packaged CD-ROM on a record/play device 140, and installs a printer driver (S202). The printer driver installed on the computer requests the printer 1 to transmit correction values to the computer 110 (S203). The printer 1 transmits, on request, to the computer 110 tables of correction values stored in its memory 63 (S302). The printer driver stores the correction values transmitted by the printer 1 in the memory (S204). As a result thereof, the tables of correction values are created in the computer. After completion of these processes, the printer driver is on standby until the printer driver receives a print command by the user (NO in S205).

When the printer driver receives a print command by the user (YES in S205), the printer driver generates print data based on the correction values (S206), and transmits the print data to the printer 1. The printer 1 prints according to the print data (S303).

Figure 23:
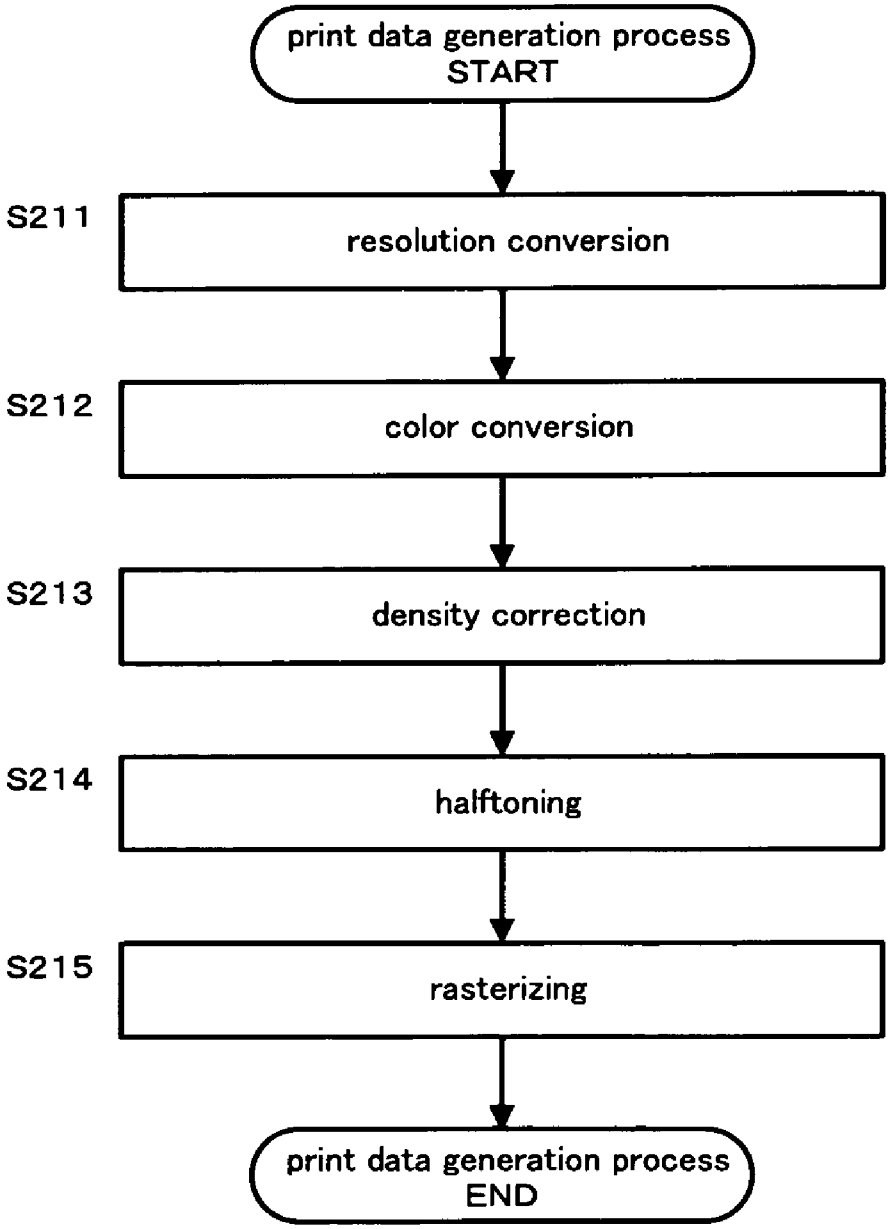
FIG. 23 is a flowchart showing processes in print data generation.

FIG. 23 is a flowchart showing processes in print data generation. These processes are performed by the printer driver.

First, the printer driver converts resolution (S211). The resolution conversion is a process for converting image data (text data, picture data, and the like) outputted by an application program into resolution with which the image is to be printed on paper. For example, if the resolution for printing the image on the paper is specified as 720×720 dpi, the image data received from the application program is converted into image data with resolution of 720×720 dpi. The image data after the resolution conversion is data with 256 tone levels represented by RGB color space (RGB data).

Next, the printer driver converts colors (S212). The color conversion is a process for converting RGB data into CMYK data, which is represented by CMYK color space. This color conversion is performed by the printer driver's referring to a table in which tone values of RGB data are associated with tone values of CMYK data (Color Conversion Lookup Table: LUT). In this color conversion, RGB data of each pixel is converted into CMYK data which corresponds to a color of ink. Data after the color conversion is CMYK data with 256 tone levels represented by CMYK color space.

Next, the printer driver performs density correction (S213). The density correction is a process for correcting a tone value of each pixel data based on the correction values corresponding to the row region which the pixel data belongs to.

Figure 24:
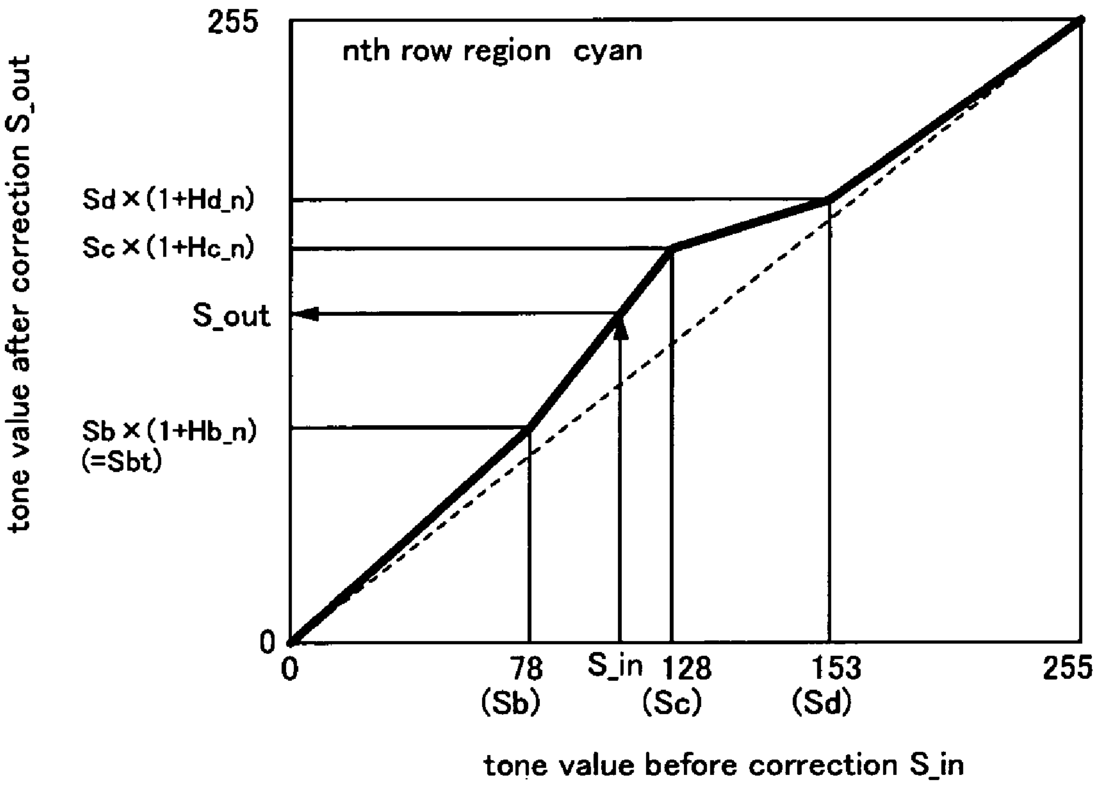
FIG. 24 is an explanatory diagram showing how to correct a density of the nth row region of cyan.

FIG. 24 is an explanatory diagram showing how to correct a density of the nth row region of cyan. The figure shows how a tone value S_in of pixel data of pixels belonging to the nth row region of cyan is corrected. A corrected tone value is S_out.

In case that a uncorrected tone value S_in of pixel data equals to the designated tone value Sb, the printer driver can form an image with the target value Cbt in the unit region corresponding to the pixel data if the printer driver corrects the tone value S_in so that it becomes equal to the target designated tone value Sbt. In short, if the uncorrected tone value S_in of the pixel data equals to the designated tone value Sb, it is preferable that the tone value S_in (=Sb) is corrected to Sb×(1+Hb) using the correction value Hb corresponding to the designated tone value Sb. Also, if the tone value S of the pixel data before the correction equals to the designated tone value Sc, it is preferable that the tone value S_in (=Sc) is corrected to Sc×(1+Hc).

On the other hand, if the uncorrected tone value S_in is different from the designated tone value, the tone value S_out to be outputted is calculated with linear interpolation as shown in the figure. In linear interpolation in the figure, sections between the corrected tone values S_out (Sbt, Sct, and Sdt) corresponding to the designated tone values (Sb, Sc, and Sd) are interpolated with linear interpolation. However, the invention is not limited thereto. For example, a correction value H corresponding to a tone value S_in can be calculated by linear interpolation between the correction values (Hb, Hc, and Hd) corresponding to the designated tone values, and a corrected tone value can be calculated with the formula S_in×(1+H) based on the correction value H calculated.

Regarding pixel data of each of the first through thirtieth row regions in the front-end print region, the printer driver performs density correction based on the correction values corresponding to each of the first through thirtieth row regions, which are stored in the table of correction values for the front-end print region. For example, regarding pixel data of the first row region in the front-end print region, the printer driver performs density correction based on the correction value (Hb__1, Hc__1, or Hd__1) corresponding to the first row region stored in the table of correction values for the front-end printing.

Also, regarding pixel data of each of the first through seventh row regions in the regular print region (each of the thirty-first through thirty-seventh row regions in the entire print region), the printer driver performs density correction based on the correction values corresponding to each of the first through seventh row regions, which are stored in the table of correction values for the regular print region. However, though there are thousands of row regions in the regular print region, the correction values corresponding to only seven row regions are stored in the table of correction values for the regular print region. Accordingly, regarding pixel data of each of the eighth through fourteenth row regions in the regular print region, the printer driver performs density correction based on the correction values corresponding to each of the first through seventh row regions, which are stored in the table of correction values for the regular print region. Thus, regarding row regions in the regular print region, the printer driver uses, repeatedly for every seven row regions, the correction values corresponding to each of the first through seventh row regions. Since there is regularity for every seven row regions in the regular print region, the characteristic of unevenness in density is also expected to appear in the same cycle. Therefore, using the correction values repeatedly in the same cycle reduces an amount of data of the correction values to be stored.

Though the number of the row regions in the regular print region of the correction pattern is fifty six, the number of row regions in the regular print region of a print image to be printed by the user is much more than the above-mentioned number and is in the order of thousands. The rear-end print region consisting of thirty row regions is formed on the upstream side of the regular print region in the carrying direction (the rear-end side of the paper).

In the rear-end print region, same as the front-end print region, regarding pixel data of each of the first through thirtieth row regions in the rear-end print region, the printer driver performs density correction based on the correction values corresponding to each of the first through thirtieth row regions, which are stored in the table of correction values for the rear-end print region.

By the above-mentioned density correction, in a row region which tends to be visually perceived darker in color, a tone value of pixel data (CMYK data) of pixels corresponding to that row region is corrected in order to be lower. On the contrary, in a row region which tends to be visually perceived lighter in color, a tone value of pixel data of pixels corresponding to that row region is corrected in order to be higher. In addition, for other row regions in other colors, the printer driver performs correction in the same way.

Next, the printer driver performs a halftoning process (S214). Halftoning is a process for converting data with a finer gradation of tone into data with a gradation of a tone that can be formed by the printer. For example, by halftoning, data with 256 tone levels is converted into 1-bit data with 2 tone levels or 2-bit data with 4 tone levels. In halftoning, in order to enable the printer to form dots in a scattered manner, pixel data is generated using dithering, gamma correction, error diffusion, and the like. When the printer driver performs halftoning process, the printer driver refers to a dither table in case of dithering, refers to a gamma table in case of gamma correction, and refers to an error memory for storing diffused errors in case of error diffusion. The halftoned data has the resolution equivalent to the above-mentioned RGB data (for example, 720×720 dpi).

In the present embodiment, the printer driver performs the halftoning process to pixel data with tone values corrected by density correction. As a result thereof, in a row region which tends to be visually perceived darker in color, the dot-generation rate of dots which a raster line in that row region consists of decreases because tone values of pixel data of that row region are corrected in order to be lower. On the contrary, in a row region which tends to be visually perceived lighter in color, the dot-generation rate increases.

Next, the printer driver rasterizes data (S215). Rasterizing is a process for rearrange the order of image data which is in a matrix form, into the order of transmission to the printer. Rasterized data is outputted to the printer as pixel data contained in the print data.

When the printer prints based on the print data generated as mentioned above, the dot-generation rate of a raster line in each of row regions are changed and densities of pieces of image in the row regions is corrected, and thereby unevenness in density in the entire print image is suppressed as shown in FIG. 9C.

Though, in the explanation above, the number of nozzles and the number of row regions (the number of raster lines) are reduced for convenience of explanation, the actual number of nozzles is 180, and, for example, the number of row regions in the front-end print region is 360. However, processes performed by the program for obtaining correction values, the printer driver, and the like are almost the same.

Effects on Gradient of Measured Values of Density

Regarding Gradient of Measured Values of Density

Figure 25A:
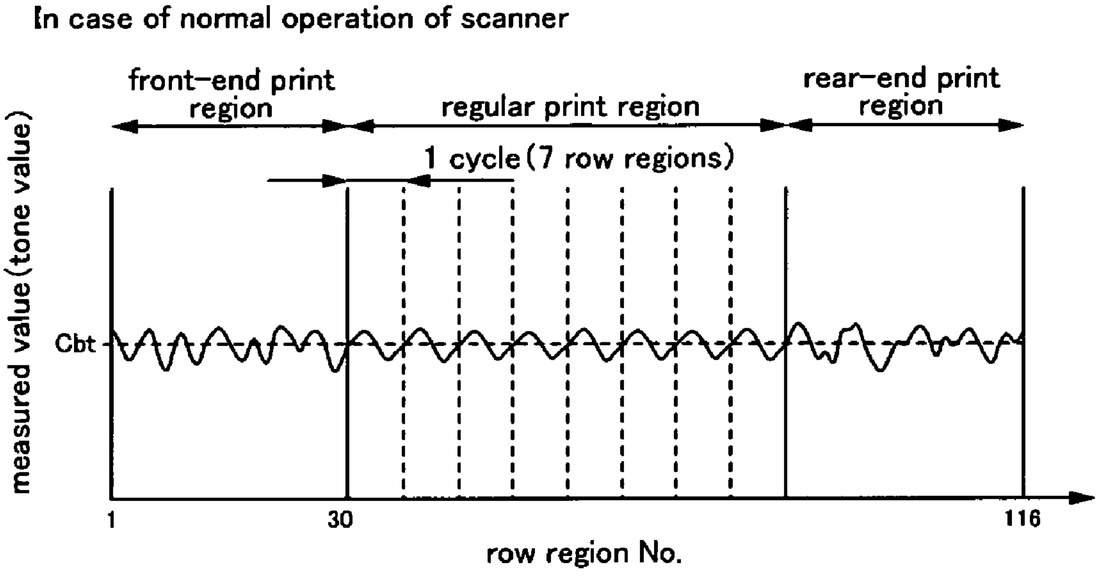
FIG. 25A is a graph of measured values in case that a scanner is in normal operation.
Figure 25B:
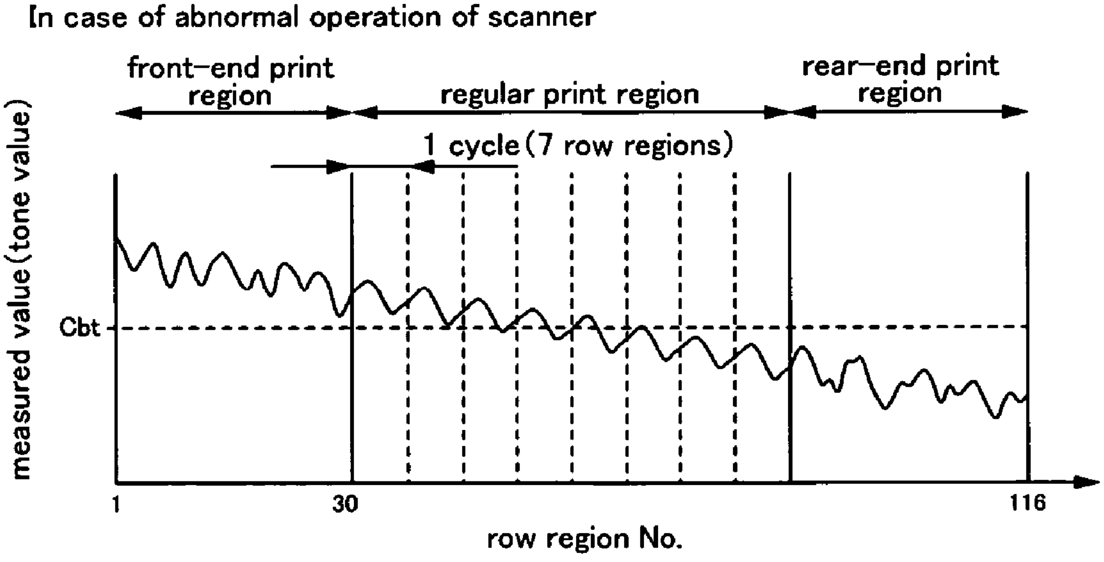
FIG. 25B is a graph of measured values in case that a scanner is in abnormal operation.

FIG. 25A is a graph of measured values of density of each row region in the 30% CD belt-like pattern incase that a scanner is in normal operation. When a scanner is in normal operation, the measured values are concentrated closely around an average measured value Cbt through the entire row regions. FIG. 25B is a graph of measured values of density of each row region in the 30% CD belt-like pattern in case that a scanner is in abnormal operation. For example, if a guiding member 154 of a scanner 150 (see FIG. 5A) is mounted obliquely, or if a document 5 does not adhere to a platen glass since a lid 151 is not lowered sufficiently, optical distance between the document 5 and a line sensor 158 changes depending on the location of a reading carriage 153 in the sub-scanning direction. If, because of this effect, outputs of the line sensor 158 change depending on the location of the reading carriage 153 in the sub-scanning direction, there are cases in which measured values change depending on the location of each of row regions and a gradient exists throughout the measured values.

The section below describes effects in cases that a graph of measured values slopes downward from left to right.

Regarding Effects on Gradient of Measured Values of Density (1)

Figure 31A:
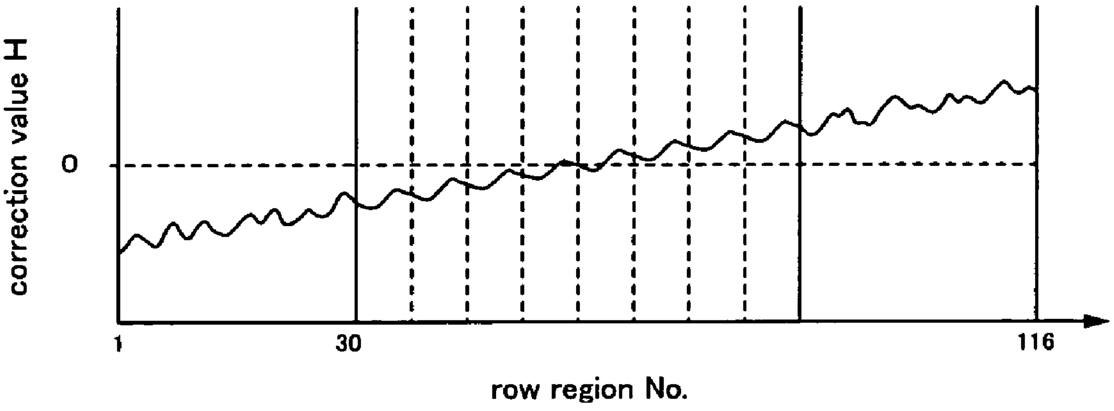
FIG. 31A is a graph of correction values for comparison.

FIG. 31A is a graph of correction values of a reference example. In the graph of a reference example, unlike the above-mentioned explanation, a correction value of each of row regions is calculated depending on a measured value of each of the row regions, and an average measured value of row regions each of which is in every seven regions is not used in order to calculate correction values in the regular print region.

When the gradient of the measured values exists depending on the location of each of row regions, there also is a gradient in the correction values calculated based on the measured values depending on the location of each of row regions. For example, regarding a row region closer to or in the front end, correction values are set in order to decrease a tone value S_in excessively (minus correction values) because density is measured darker than the actual density. On the other hand, regarding a row region closer to or in the rear end, correction values are set in order to increase a tone value S_in excessively (plus correction values) because density is measured lighter than the actual density.

In this way, as a result that the gradient of the correction values exists depending on the location of each of row regions, the print image of which the density has been corrected is printed gradually darker from the front end to the rear end. (However, deterioration of image quality is not conspicuous because the difference in density between row regions contiguous to each other is not serious.)

Regarding Effects on Gradient of Measured Values of Density (2)

As mentioned above, in the regular print region, an average measured value of eight row regions each of which is in every seven regions (for example, eight row regions in the regular print region: the first, eighth, fifteenth, twenty-second, twenty-ninth, thirty-sixth, forty-third, and fiftieth ones) is used as a measured value when correction values are calculated.

Figure 26A:
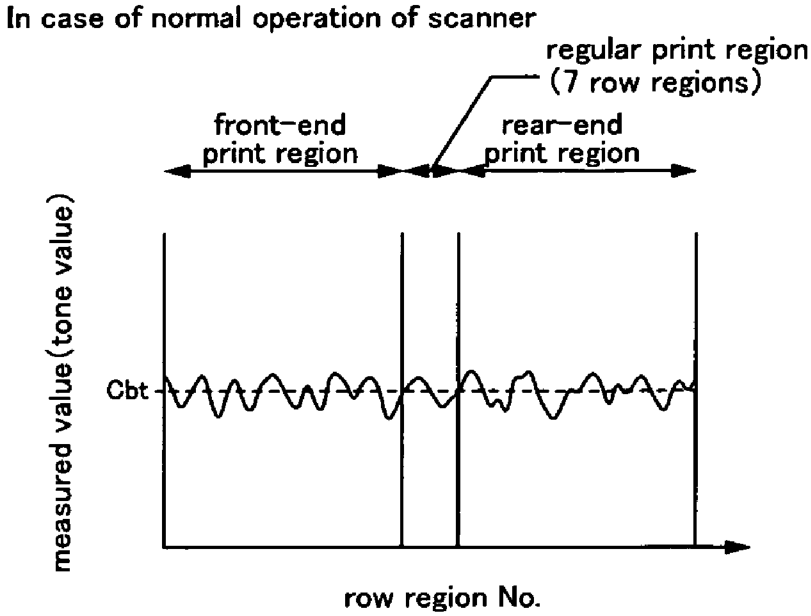
FIGS. 26A and 26B show measured values arranged in order, which are used on calculation of correction values.
Figure 26B:
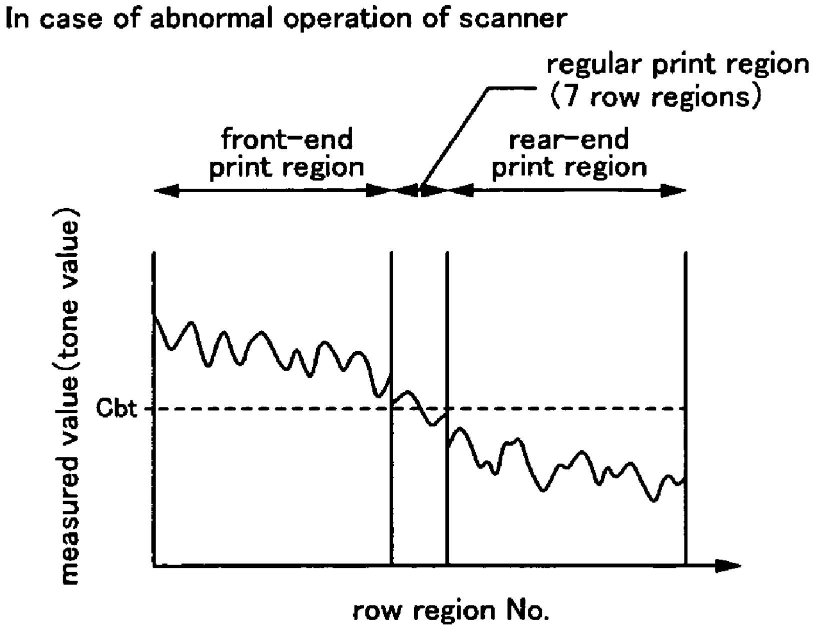

FIGS. 26A and 26B show measured values arranged in order, which are used on calculation of correction values. FIG. 26A is a graph in case that a scanner is in normal operation, and FIG. 26B is a graph in case that the scanner is in abnormal operation. Though the measured values in the front-end print region or in the rear-end print region are the same as the measured values shown in FIG. 25A or FIG. 25B, each of seven measured values in the regular print region is an average measured value of the eight row regions each of which is in every seven regions.

Here, in order to focus on a boundary between the front-end print region and the regular print region, this description focuses on a measured value of density of the thirtieth row region in the front-end print region and a measured value (an average value) of density of the first row region in the regular print region (the thirty-first row region in the entire print region).

On calculation of the correction value in the front-end print region, the measured value of density in the front-end print region is used without calculation. Thus, when the scanner is in abnormal operation, the measured value which is measured darker than the actual density is used as it is on calculation of the correction value.

On the other hand, the average value of eight row regions each of which is in every seven regions is used on calculation of the correction value in the regular print region. Density of the first row region in the regular print region is measured darker than the actual density, and a row region is measured lighter in color as the region is located more upstream in the carrying direction (for example, the fiftieth row region). Therefore, the average measured value of eight row regions which are the first, eighth, fifteenth, twenty-second, twenty-ninth, thirty-sixth, forty-third, and fiftieth ones in the regular print region becomes lower than the measured value of the first row region in the regular print region.

As a result thereof, despite that the measured values of density of the first through thirtieth row regions in the front-end print region continuously slope, discontinuity occurs between the measured value of density of the thirtieth row region in the front-end print region and the measured value of density of the first row region in the regular print region (the average value).

Figure 31B:
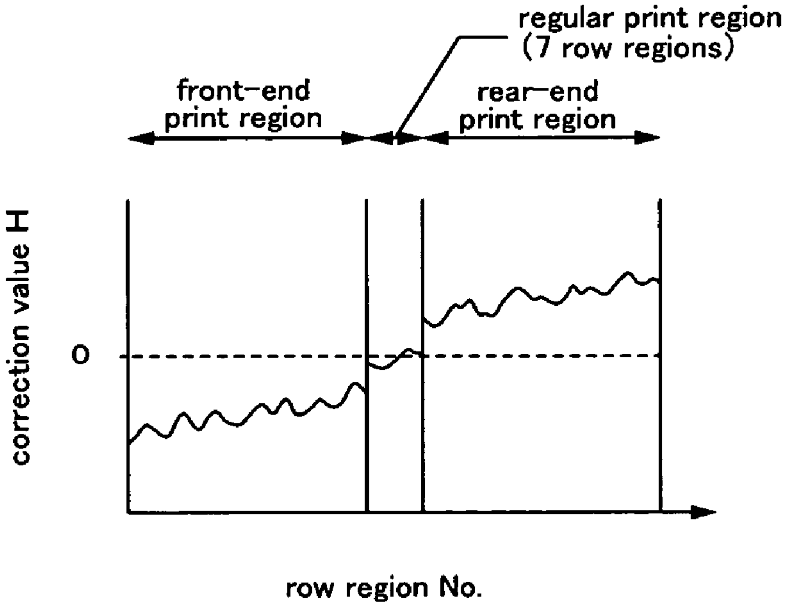
FIG. 31B is a graph of correction values when a gradient of measured values exists in the present embodiment.

FIG. 31B is a graph of correction values when the gradient of measured values exists. Here, an average measured value of row regions each of which is in every seven region is used on calculation of the correction values in the regular print region.

If the measured values are discontinuous at the boundary between print regions in this way, the correction values calculated based on the measured values also become discontinuous. As a result thereof, it becomes conspicuous that the image in the front-end print region on the most upstream side in the carrying direction (piece of image of the thirtieth row region in the front-end print region) is darker in color in comparison with the image in the regular print region.

Also, discontinuity occurs between the measured value of density of the seventh row region in the regular print region (the average value) and the measured value of density of the first row region in the rear-end print region (without calculation). Also, the correction values calculated based on the measured values become discontinuous. As a result thereof, it becomes conspicuous that the image in the rear-end print region on the most downstream side in the carrying direction (piece of image of the first row region in the rear-end print region) is lighter in color in comparison with image in the regular print region.

Figure 27:
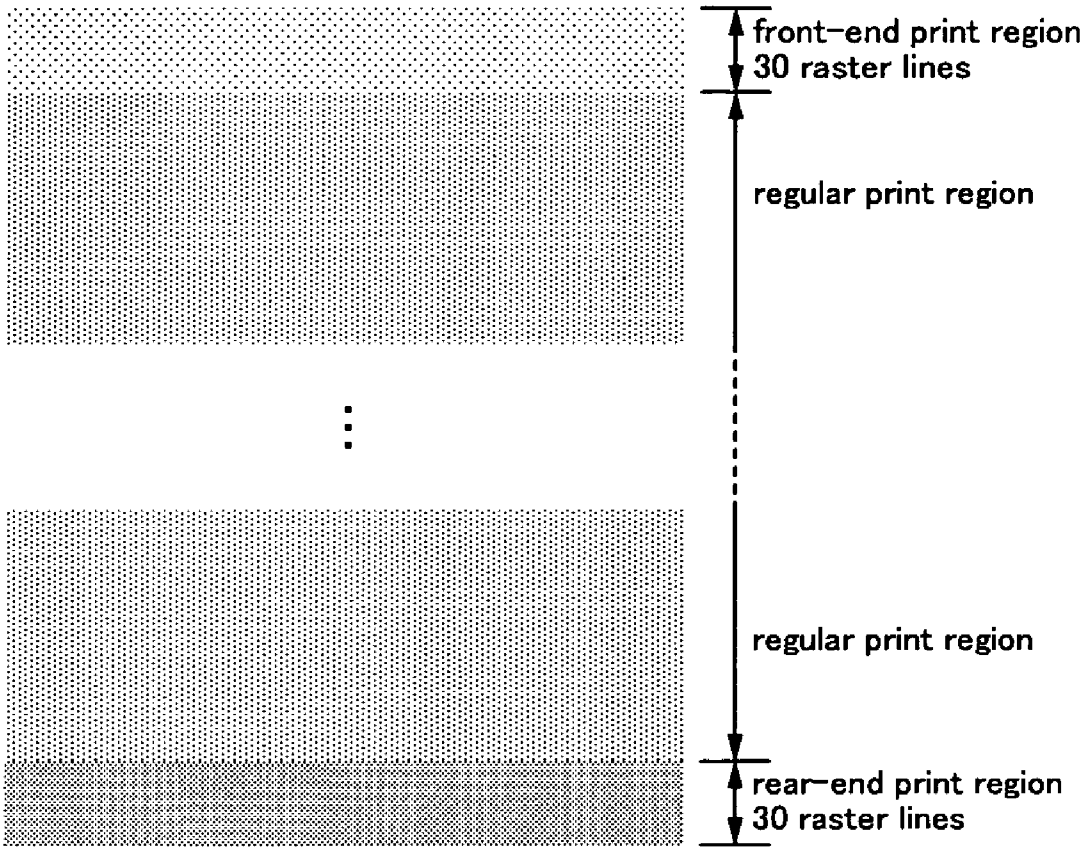
FIG. 27 is an explanatory diagram showing density around a boundary between the front-end print region and the regular print region and density around a boundary between the regular print region and the rear-end print region.

FIG. 27 is an explanatory diagram showing density around the boundary between the front-end print region and the regular print region and density around the boundary between the regular print region and the rear-end print region. For convenience of explanation, image data which is the source of this print image is image with uniform density. (Though density in each of the print regions is described to be constant for convenience of explanation in FIG. 27, gradual change in density occurs even in each of the print regions in contemplation of effects described in the above-mentioned "Regarding Effects on Gradient of Measured Values of Density (1)".)

In this way, in case that the gradient exists throughout the measured values because of abnormal operation of the scanner, density correction makes the difference in density more conspicuous at the boundary between each of print regions.

Regarding Effects on Gradient of Measured Values of Density (3)

Figure 28:
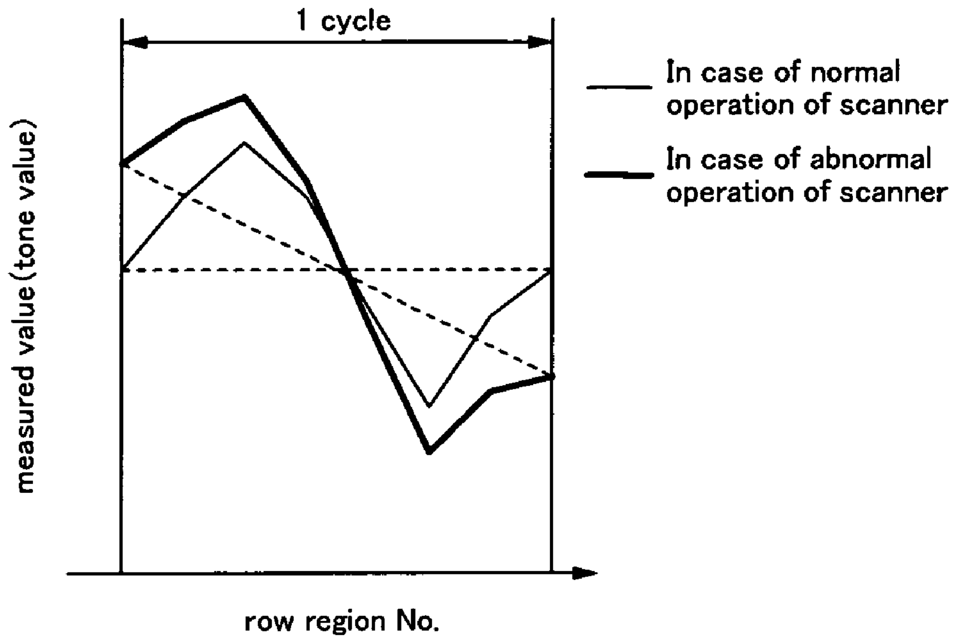
FIG. 28 is a graph of measured values (average values) in the regular print region which correspond to one cycle.

FIG. 28 is a graph of measured values (average values) in the regular print region which correspond to one cycle. The graph with a thin line shows values in cases that the gradient of the measured values does not exist, and the graph with a thick line shows values in cases that the gradient of the measured values exists. In this graph, for convenience of explanation, the gradient of measured values is shown larger than that of the above-mentioned graph.

As described above, in the regular print region, an average measured value of eight row regions each of which is in every seven regions is used as a measured value when correction values are calculated. Here, in comparison between the average measured value of eight row regions which are the first, eighth, fifteenth, twenty-second, twenty-ninth, thirty-sixth, forty-third, and fiftieth ones in the regular print region and the average value of eight row regions which are the seventh, fourteenth, twenty-first, twenty-eighth, thirty-fifth, forty-second, forty-ninth, and fifty-sixth ones in the regular print region, the former average value tends to be measured darker than the latter one. In short, the measured values (the average values) of density in the regular print region which correspond to one cycle slope downward from left to right. If the measured values (the average values) change downward or upward depending on the location of each of row regions corresponding to one cycle, the correction values calculated based on the measured values change in the same way depending on the location of each of the row regions. As a result thereof, in case of printing an image of which the density has been corrected, the image is printed gradually darker within the row regions corresponding to one cycle.

In the regular print region, the correction values of the row regions corresponding to one cycle are used repeatedly for every seven row regions. Therefore, when the correction value of the seventh row region is used as a correction value of a certain row region, the correction value of the first row region is used as the correction value of the row region contiguous to the above-mentioned region on the upstream side in the carrying direction. As a result thereof, a relatively darker image among regions in one cycle (apiece of image of a row region to which the correction value of the seventh row region is applied) is contiguous to a relatively lighter image (a piece of image of a row region to which the correction value of the first row region is applied), and the difference in density becomes more conspicuous. In addition, a part where this difference in density is conspicuous occurs repeatedly every one cycle.

Figure 29:
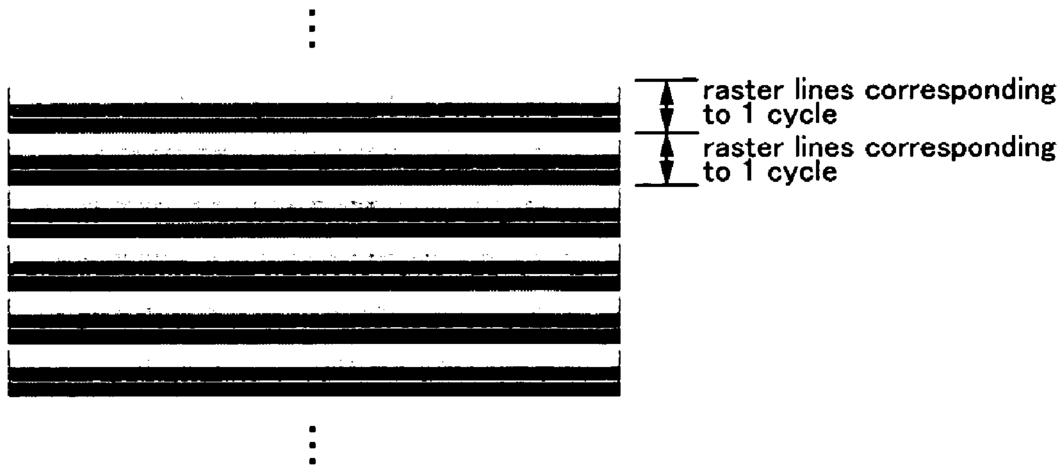
FIG. 29 is an explanatory diagram showing density of a regular print region after density correction in case that a scanner is in abnormal operation.

FIG. 29 is an explanatory diagram showing density of the regular print region after density correction in case that a scanner is in abnormal operation. For convenience of explanation, image data which is the source of this print image is an image with uniform density.

Here, since the number of nozzle is reduced in this explanation for convenience of explanation, it is possible that the difference in density which occurs every one cycle is not conspicuous because the width of seven row regions, which corresponds to one cycle, is narrow, 7/720 inch, and the difference in density is small between the first row region and the seventh row region within one cycle. However, in practice, the actual number of nozzle is 180, the width of the row regions which corresponds to one cycle is 179/720 inch, and the difference in density is large between the first row region and the 179th row region within one cycle. Therefore, the difference in density which occurs every one cycle tends to become conspicuous.

In short, if the gradient exists throughout the measured values, streaks on the print image become conspicuous despite density correction.

In the first embodiment described below, in order to prevent adverse effects caused by the gradient of the above-mentioned graph of measured values, the gradient of the graph of the measured values is modified. On the other hand, in the second embodiment, the correction values are modified. Furthermore, in the third embodiment, in addition to modification of the gradient of the graph of the measured values, the correction values calculated based on the modified measured values are further modified.

The First Embodiment

Modification of Measured Values

In the present embodiment, in order to prevent adverse effects caused by the gradient of a graph of measured values, the gradient of the graph of the measured values is modified and, correction values are calculated based on the modified measured values.

Figure 30A:
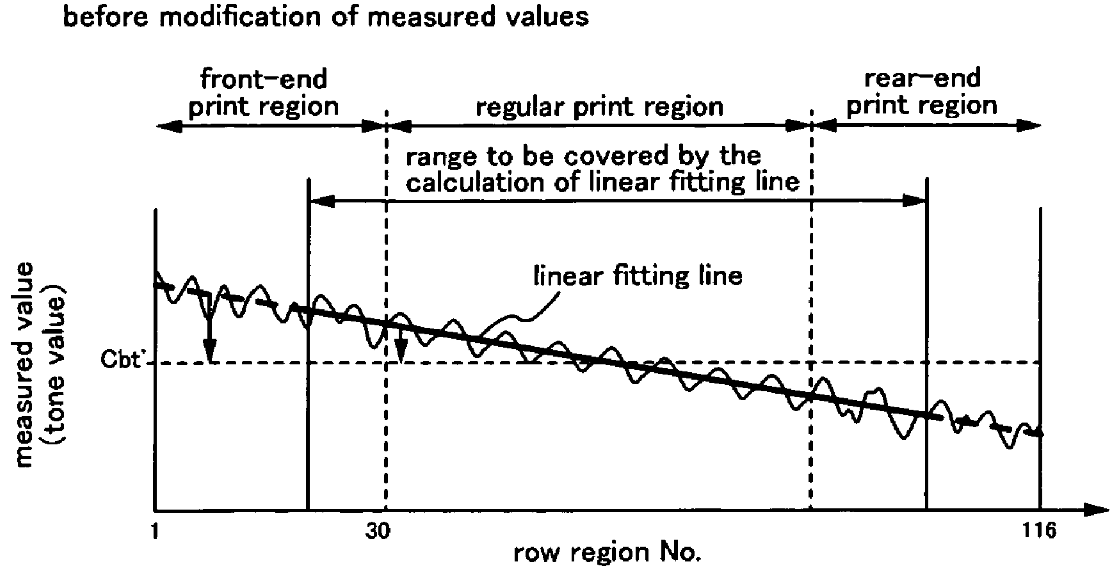
FIG. 30A is a graph of measured values before modification.

FIG. 30A is a graph of measured values before modification. The measured values mentioned in this section are the same as shown in the graph in FIG. 25B.

A program for obtaining correction values obtains measured values of density of each of row regions in the range of the twenty-first through 106th row regions which is the range to be covered by the calculation. The reason why the first through twentieth row regions, which are located more downstream in the carrying direction than this range to be covered by the calculation, are excluded from the range to be covered by the calculation is because it is possible that the first through twentieth row regions are measured lighter in density due to the fact that the first through twentieth row regions are located near the margin on the downstream side in the carrying direction of the correction patterns and therefore the image in the first through twentieth row regions is read under the influence of the margin. Also, the reason why the 107th through 126th row regions are excluded from the range to be covered by the calculation is because it is possible that the 107th through 126th row regions are measured lighter in density due to the fact that the 107th through 126th row regions are located near the margin on the upstream side in the carrying direction of the correction patterns and therefore the image in the 107th through 126th row regions is read under the influence of the margin. On the other hand, the range to be covered by the calculation includes at least a part of the front-end print region and the rear-end print region. This is for obtaining the gradient of measured values in contemplation of these print regions.

The program for obtaining correction values calculates a linear fitting line (a line for approximation) by the least-square method based on the measured values of density of each of row regions which are located within the range to be covered by the calculation. In FIG. 30A, the linear fitting line is shown with a thick line. Furthermore, the program for obtaining correction values calculates the average value Cbt' based on the measured values of density of each of row regions which are located within the range to be covered by the calculation. This average value Cbt' is the above-mentioned target value Cbt.

Next, the program for obtaining correction values calculates, for each row region, a difference between a value of the linear fitting line in each row region and the average value Cbt', and the difference is used as the modification value of the row region. Regarding each row region outside the range to be covered by the calculation, the linear fitting line is extended, a difference between a value of the extended line in the row region and the average value Cbt' is calculated, and the difference is used as the modification value of the row region. The program for obtaining correction values modifies the measured value of each of the row regions by subtracting the modification value from the measured value of each of the row regions.

Figure 30B:
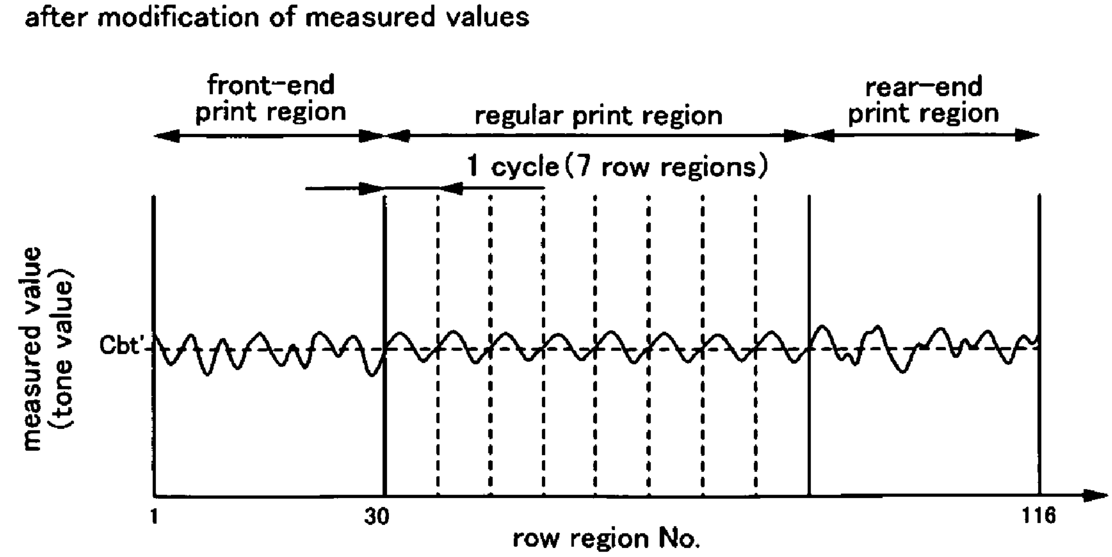
FIG. 30B is a graph of measured values after modification.

FIG. 30B is a graph of the measured values after modification. The gradient of the graph is eliminated throughout the modified measured values. The program for obtaining correction values calculates the correction values based on the modified measured values (S109), and stores the calculated correction values in a memory 63 of a printer 1 (S110). Under instructions by a user, a printer driver performs density correction based on the correction values calculated based on the modified measured values and generates print data, and the printer prints based on the print data.

In the present embodiment, since the modified measured values are around the average value Cbt' regardless of the location of each of row regions, density is uniform throughout the print image even when, for example, an image with uniform density is corrected by density correction and is printed. In short, the present embodiment can suppress the phenomenon that density of a print image after density correction changes gradually depending on the location of each of the row regions throughout the print image.

In the present embodiment, regarding the boundary between the front-end print region and the regular print region, the measured values of density in the front-end print region around the boundary and the measured values (average values) of density of row regions in the regular print region around the boundary are around the average value Cbt'. As a result thereof, the measured values of row regions are continuous around the boundary between the front-end print region and the regular print region. Also, the measured values of row regions are continuous around the boundary between the regular print region and the rear-end print region. As a result thereof, in the present embodiment, even though density of row regions in the regular print region is corrected based on correction values corresponding to one cycle, the difference in density, which stands out in FIG. 27, is not conspicuous around the boundary between each of print regions.

In addition, in the present embodiment, all of the measured values (average values) in the regular print region corresponding to one cycle are around the average value Cbt'. As a result thereof, both of the measured value of density of the first row region and the measured value of density of the seventh row region within one cycle are around the average value Cbt' and are continuous. As a result thereof, in the present embodiment, even if the correction values corresponding to one cycle are used repeatedly, the difference in density which occurs every one cycle as shown in FIG. 29 is not conspicuous.

The Second Embodiment

Modification of Correction Value

Figure 32A:
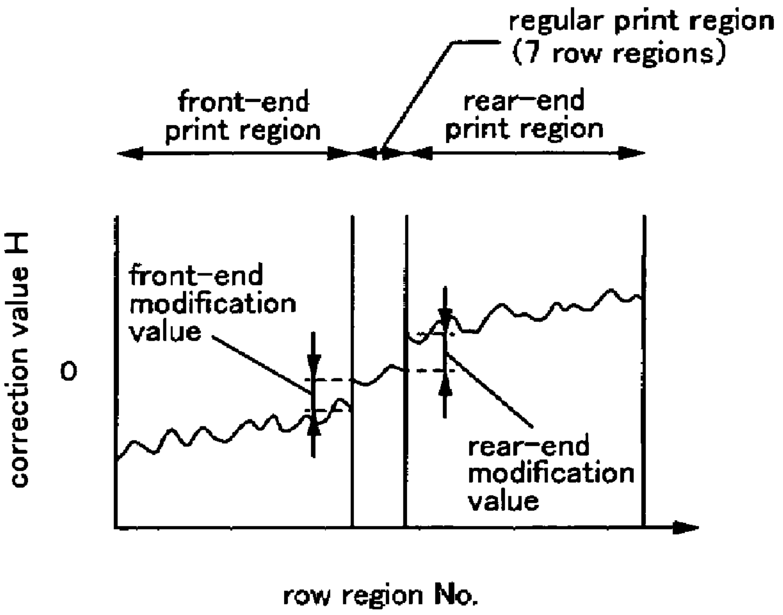
FIG. 32A is an explanatory diagram showing correction values before modification.
Figure 32B:
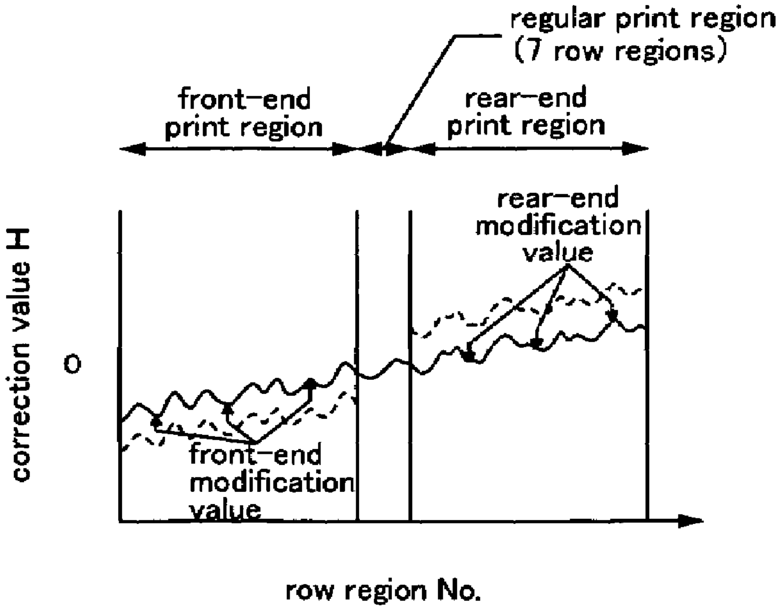
FIG. 32B is an explanatory diagram showing correction values after modification.

FIG. 32A is an explanatory diagram showing correction values before modification. FIG. 32B is an explanatory diagram showing correction values after modification. It should be noted that on calculation of correction values in the second embodiment, measured values are not modified as described in the first embodiment. Here, first, a front-end modification value is described.

First, a program for obtaining correction values obtains correction values of ten row regions, five each before and after a boundary between each of print regions, in order to calculate the front-end modification value. Here, the program for obtaining correction values obtains the correction values of the twenty-fifth through thirtieth row regions in the front-end print region and the correction values of the first through fifth row regions in the regular print region.

Then, the program for obtaining correction values calculates respectively an average value of the correction values of the five row regions obtained from each of the print regions. Here, the program for obtaining correction values calculates respectively an average value of the correction values of the twenty-fifth through thirtieth row regions in the front-end print region and an average value of the correction values of the first through fifth row regions in the regular print region.

Next, the program for obtaining correction values calculates a difference between the average value in the front-end print region and the average value in the regular print region, and this difference is used as the front-end modification value. Here, the program for obtaining correction values calculates the front-end modification value by subtracting the average value in the front-end print region from the average value in the regular print region.

Next, the program for obtaining correction values modifies the correction values by adding respectively the front-end modification value to each of the correction values in the front-end print region. As a result thereof, in FIG. 32B, each of the unmodified correction values in the front-end print region which are indicated with a dotted line becomes each of modified values which are indicated with a solid line. In short, the correction values in the front-end print region are modified in order to reduce the difference between the correction values in the front-end print region and the correction values in the regular print region. As a result thereof, after modification of the correction values, discontinuity between the correction values in the front-end print region and the correction values in the regular print region can be reduced.

Also, the program for obtaining correction values calculates a rear-end modification value for a boundary between the regular print region and the rear-end print region, and modifies the correction values by adding respectively the rear-end modification value to each of the correction values in the rear-end print region. As a result thereof, the difference in density between an image in the rear-end print region and an image in the regular print region can be reduced.

Then, the program for obtaining correction values stores the correction values modified as mentioned above in a memory 63 of a printer 1 (S110). Under instructions by a user, a printer driver performs density correction based on the modified correction values and generates print data, and the printer prints based on the print data.

In the present embodiment, for example, the difference in density between an image on the most upstream side in the carrying direction in the front-end print region (a piece of image of the thirtieth row region in the front-end print region) and an image in the regular print region becomes small, and therefore the difference in density becomes less conspicuous around the boundary between each of print regions. Furthermore, in the present embodiment, for example, the difference in density between an image on the most downstream side in the carrying direction in the rear-end print region (a piece of image of the first row region in the rear-end print region) and an image in the regular print region becomes small, and therefore the difference in density becomes less conspicuous around the boundary between each of print regions.

The Third Embodiment

Modification of Measured Values and Modification of Correction Values

In the present embodiment, in order to prevent adverse effects caused by the gradient of a graph of measured values, the gradient of the graph of the measured values is modified and correction values are calculated based on the modified measured values. Modification of the measured values is not described because it is the same as the first embodiment mentioned above.

FIG. 30B is a graph of the measured values after modification. The gradient of the graph is eliminated throughout the modified measured values. A program for obtaining correction values calculates the correction values based on these modified measured values.

Figure 33A:
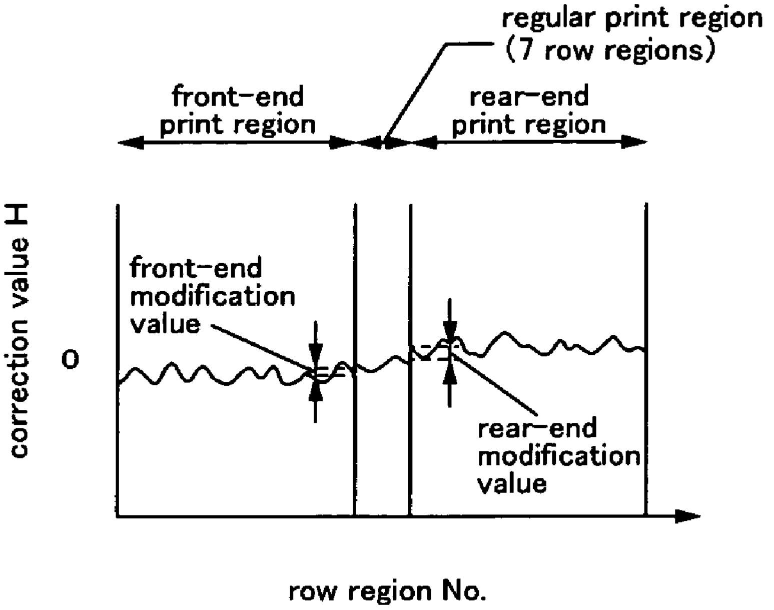
FIG. 33A is an explanatory diagram showing correction values before modification.
Figure 33B:
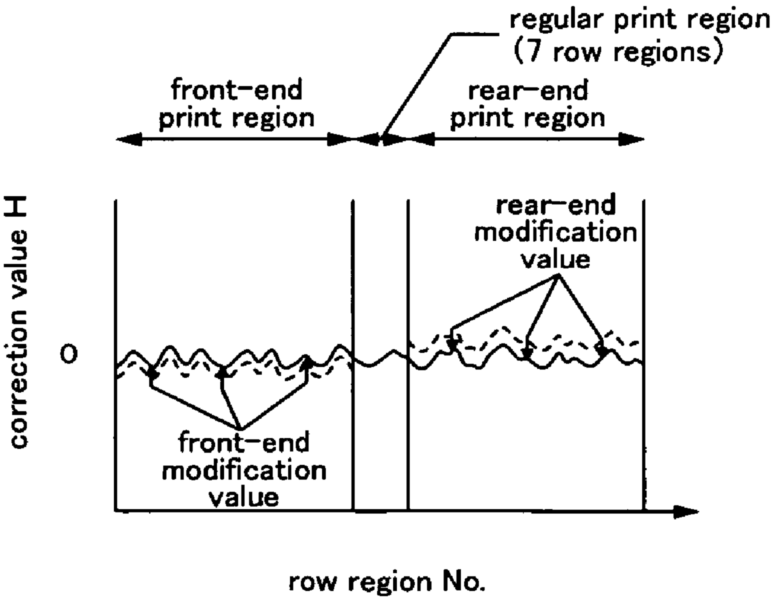
FIG. 33B is an explanatory diagram showing correction values after modification.

FIG. 33A is an explanatory diagram showing correction values before modification. FIG. 33B is an explanatory diagram showing correction values after modification. Even if the correction values are calculated after modification of the gradient of the measured values, using an average value as the measured value of a row region in the regular print region may cause discontinuity of the correction values at the boundary between each of print regions. If density is corrected based on these correction values, the difference in density may become conspicuous around the boundary between each of print regions. Therefore, in the same way as the above-mentioned method of modifying the correction values, the program for obtaining correction values calculates a front-end modification value around the boundary between the front-end print region and the regular print region, and modifies the correction values by adding respectively the front-end modification value to each of the correction values in the front-end print region. As a result thereof, the correction values in the front-end print region are modified such that the difference between the correction values in the front-end print region and the correction values in the regular print region is reduced. The program for obtaining correction values also calculates a rear-end modification value around the boundary between the regular print region and the rear-end print region, and modifies the correction values by adding respectively the rear-end modification value to each of the correction values in the rear-end print region. As a result thereof, the correction values in the rear-end print region are modified such that the difference between the correction values in the rear-end print region and the correction values in the regular print region is reduced.

Then, the program for obtaining correction values stores these modified correction values in a memory 63 of a printer 1 (S110). Under instructions by a user, the printer driver performs density correction and generates print data based on the modified correction values, and the printer prints based on this print data.

In the present embodiment, since the modified measured values are around the average value Cbt' regardless of the location of each of row regions, density is uniform throughout the print image even when, for example, an image with uniform density is corrected by density correction and is printed. In short, the present embodiment can suppress the phenomenon that density of a print image after density correction changes gradually depending on the location of each of row regions throughout the print image.

In the present embodiment, regarding the boundary between the front-end print region and the regular print region, the measured values of density in the front-end print region around the boundary and the measured values (average values) of density of row regions in the regular print region around the boundary are around the average value Cbt'. As a result thereof, the measured values of row regions are continuous around the boundary between the front-end print region and the regular print region. Also, the measured values of row regions are continuous around the boundary between the regular print region and the rear-end print region. However, even if the correction values are calculated after modification of the gradient of measured values, there are cases in which the correction values become discontinuous at the boundary between each of print regions because an average value is used as a measured value of a row region in the regular print region. On the other hand, in the present embodiment, the correction values are further modified in order to reduce the difference between correction values around the boundary between each of print regions. As a result thereof, the difference in density between an image in the regular print region and images in the front-end print region and rear-end print region becomes small, and the difference in density becomes less conspicuous around the boundary between each of print regions. Furthermore, in the present embodiment, even though density of row regions in the regular print region is corrected based on correction values corresponding to one cycle, the difference in density, as shown in FIG. 27, is not conspicuous around the boundary between each of print regions. In addition, in the present embodiment, all of the measured values (the average values) corresponding to one cycle in the regular print region are around the average value Cbt'. As a result thereof, both of the measured value of density of the first row region and the measured value of density of the seventh row region within one cycle are around the average value Cbt' and are continuous. As a result thereof, in the present embodiment, even if correction values corresponding to one cycle are used repeatedly, the difference in density, as shown in FIG. 29, which occurs every one cycle is not conspicuous.

Other Embodiments

Though the printer 1 and printing system 100 as one embodiment are described above, the above-mentioned embodiments are provided for facilitating the understanding of the invention, and are not to be interpreted as limiting the invention. As a matter of course, the invention can be altered and improved without departing from the gist thereof and the invention includes equivalent thereof.

For example, the above-mentioned printer 1 is a separate unit from the scanner 150. However, a multifunction machine into which a printer and scanner are incorporated can be used.

In the above-mentioned embodiments, the test pattern is printed and the tables of correction values are created on the inspection process in manufacturing of the printer 1, but the invention is not limited thereto. For example, a user who has purchased the printer 1 can print a test pattern with the printer 1, read the test pattern with the scanner 150, and create tables of correction values. In this case, the printer driver can include the program for obtaining correction values.

Furthermore, in the above-mentioned embodiments, one raster line is formed by one nozzle, but the invention is not limited thereto. For example, one raster line can be formed by two nozzles.

Comprehensive Description (1-1) In the above-mentioned process for obtaining correction values, a test pattern is printed first (FIG. 10, S102). In printing of the test pattern, the dot formation process (FIG. 6, S003) is performed repeatedly, and correction patterns (an example of a pattern) are formed on a sheet of paper (an example of a medium). Each of these correction patterns consists of a plurality of raster lines (an example of a dot row) respectively formed in a plurality of row regions lined up in the carrying direction.

Next, the correction patterns are read by a scanner 150 (S103, FIG. 13), and, after rotating (S105), cropping (S106) or resolution conversion (S107) if necessary, density of each of the row regions is measured (S108). Here, if the scanner 150 is in abnormal operation, output of a line sensor 158 changes depending on the location in the sub-scanning direction of a reading carriage 153, and, as a result thereof, measured values change depending on the location of each of the row regions (see FIG. 25B). In case that the correction values are calculated based on these measured values, the correction values do not reflect characteristics of a printer, and print image quality does not improve even if density correction (S213) is performed with using these correction values (see FIG. 27 and FIG. 29).

Therefore, the above-mentioned program for obtaining correction values calculates the modification values corresponding to the row regions, based on a measurement result of the row regions which are in a range to be covered by the calculation (an example of at least a part of a measurement result of density of a plurality of row regions). Specifically speaking, the program for obtaining correction values obtains the linear fitting line and the average value Cbt' based on the measurement result of row regions which are located in the range to be covered by the calculation of the linear fitting line (see FIG. 30A) and the program calculates a difference between the value of the linear fitting line in each of row regions and the average value Cbt', and the difference is used as a modification value of the row region. The program for obtaining correction values modifies the measured value of density of each of the row regions based on the modification value (FIG. 30B).

As a result thereof, even if the scanner 150 is in abnormal operation, unevenness in density reflecting characteristics of the printer can be measured almost in the same way as the measured values in normal operation of the scanner 150 (FIG. 25A).

(1-2) In the above-mentioned embodiment, among the measured values of the first through 116th row regions, those of the twenty-first through 106th row regions are specified as the range to be covered by the calculation, and the first through twentieth row regions, which are located on the end section of the correction pattern on the downstream side in the carrying direction, are excluded from the range to be covered by the calculation. Also, the 107th through 116th row regions, which are located on the end section of the correction pattern on the upstream side in the carrying direction, are excluded from the range to be covered by the calculation. This is because it is possible that those row regions are measured lighter in density than the actual density due to the fact that the end section of the correction pattern is located near the margin and measuring density of the row regions on the end section of the correction pattern is affected by the margin.

(1-3) The above-mentioned program for obtaining correction values obtains the linear fitting line and the average value Cbt' based on measurement result of the row regions which are located in the range to be covered by the calculation of the linear fitting line (see FIG. 30A) and calculates a difference between the value of the linear fitting line in each of row regions and the average value Cbt', and the difference is used as a modification value of the row region. As a result thereof, even if the gradient exists throughout the measured values, the gradient can be modified.

However, the invention is not limited to the above-mentioned method of calculating modification values. For example, quadratic curve approximation is available instead of linear approximation.

(1-4) In the above-mentioned embodiment, the linear fitting line is calculated based on the least-square method. This enables to grasp the tendency of the gradient of the measured values. However, the invention is not limited to the above-mentioned method of calculating the linear fitting line. In the least-square method, a linear fitting line that minimizes the sum of the square of differences between the measured values and the linear fitting line is calculated; however, instead thereof, a linear fitting line that minimizes the sum of the differences between the measured values and the linear fitting line can be calculated, for example.

(1-5) In the above-mentioned embodiment, it is desirable that the range to be covered by the calculation includes the measured values of density of the row regions in the front-end print region and the measured values of density of the row regions in the regular print region if the correction pattern includes the dot rows formed in the front-end print region by front-end printing (an example of the first printing) (an example of the first dot row) and the dot rows formed in the regular print region by regular printing (an example of the second printing) (an example of the second dot row). As a result thereof, the measured values of density of the row regions in the front-end print region are reflected on calculation of the linear fitting line.

(1-6) It is desirable to use the method for measuring density in which all components mentioned above are included because all advantages are achieved. However, it is not necessary to include all components. In short, it is essential only that a constitution enables to measure unevenness in density reflecting the characteristic of the printer.

(1-7) The above-mentioned program for obtaining correction values modifies the measured values of density of the row regions and calculates the correction values corresponding to the row regions based on the modified measured values. When the print image is formed on the paper (an example of a medium) under instructions by a user, the printer driver performs density correction based on the correction values (S213) and generates print data, and the printer 1 forms each of the raster lines which the print image consists of, based on the correction value corresponding to the row region in which the raster line is to be formed. As a result thereof, even if the scanner 150 is in abnormal operation, the print image can be formed without unevenness in density.

A correction value can technically be associated with to a nozzle, not with a row region. However, there are cases in which there is difference in density of color even among pieces of image formed by the same nozzle. For example, there are cases in which there is difference in density of color even among dot rows formed by nozzle #3 if rows contiguous to each of dot rows formed by nozzle #3 are formed respectively by different nozzles such as nozzle #1 and nozzle #4. Therefore, even if a specific correction value corresponds to nozzle #3 and a tone value of pixel data is associated with a raster line formed by nozzle #3 is corrected based on the correction value corresponding to nozzle #3, unevenness in density cannot surely be suppressed. Accordingly, the correction values are set corresponding to the row regions.

(1-8) The above-mentioned program for obtaining correction values calculates respective correction values corresponding to seven row regions in the regular print region (see FIG. 21). When the print image is formed under instructions by the user, the printer driver corrects the tone values of pixel data of thousands of the row regions in the regular print region using repeatedly the correction values corresponding to the seven row regions, and, based on the corrected tone values, the printer driver performs the halftoning process and generates the print data.

In case that the scanner 150 is in abnormal operation, the difference in density which occurs every one cycle repeatedly becomes conspicuous as shown in FIG. 29 if the correction values calculated based on unmodified measured values are used repeatedly. On the other hand, the above-mentioned embodiment can suppress the occurrence of these streaks.

(1-9) In the above-mentioned regular printing, a carrying process with a carry amount of 7·D (an example of a predetermined carry amount) is repeated, and then the print image is formed on the paper (an example of a medium). Before the regular printing, the program for obtaining correction values, for example, calculates the correction value corresponding to the first row region in the regular print region, based on the average measured value of eight row regions which are the first, eighth, fifteenth, twenty-second, twenty-ninth, thirty-sixth, forty-third, and fiftieth ones in the regular print region. In this way, the correction value corresponding to the nth row region in the regular print region is calculated based on the measured value of density of the nth row region in the regular print region and the measured values of density of another row region which is located an integer multiple of the carry amount of 7·D from the row region.

In case that the correction values are calculated in this way, if density correction is performed based on the correction values calculated based on the unmodified measured values, there are cases in which the correction values become discontinuous between the first row region in the regular print region and the thirtieth row region in the front-end print region contiguous to the first row region (see FIG. 26B) for example and in which the difference in density becomes conspicuous around the boundary as shown in FIG. 27. On the other hand, the above-mentioned embodiment can suppress the occurrence of this difference in density.

(1-10) In the above-mentioned embodiment, the correction value corresponding to a certain row region in the regular print region is used not only in order to correct the tone value of pixel data of that row region but also in order to correct the tone values of pixel data of other row regions which are located integer multiples of the carry amount of 7·D from the row region.

As a result thereof, the number of correction values to be stored can be reduced.

(1-11) Especially, in case of using regularity, the number of correction values to be stored can be reduced dramatically though there are thousands of row regions in the regular print region.

(1-12) Though there are thousands of row regions in the regular print region when the print image is formed under instructions by the user, there are row regions the number of which corresponds to only eight cycles (fifty-six row regions) when the correction patterns are printed. As a result thereof, since the length of the correction patterns in the carrying direction can be made short, a plurality of correction patterns lined up in the carrying direction can be formed as shown in FIG. 13, for example.

(1-13) It is desirable to use the printing method in which all components mentioned above are included because all advantages are achieved. However, it is not necessary to include all components. In short, it is only essential that a constitution enables to correct unevenness in density of a printer even if reading of correction patterns reflects characteristics of the scanner 150.

(1-14) As a matter of course, the above-mentioned embodiment discloses methods of calculating correction value as well as measuring methods and printing methods.

(1-15) As a matter of course, the above-mentioned embodiment discloses methods of manufacturing printers (an example of a printing apparatus) equipped with a memory storing the correction values. According to this method of manufacturing a printer, a printer which stores the correction values depending on the characteristics of individual printers can be manufactured despite of abnormal operation of the scanner 150.

(2-1) In the above-mentioned process for obtaining correction values, a test pattern is printed first (FIG. 10, S102). In printing of the test pattern, the dot formation process (FIG. 6, S003) is performed repeatedly, and correction patterns (an example of a pattern) are formed on a sheet of paper (an example of a medium). Each of these correction patterns consists of a plurality of raster lines (an example of a dot row) formed in a plurality of row regions lined up in the carrying direction. Next, the correction patterns are read by a scanner 150 (S103, FIG. 13), and, after rotating (S105), cropping (S106), or resolution conversion (S107) if necessary, density of each of the row regions is measured (S108). The program for obtaining correction values calculates the correction values for correcting density of a row region in the front-end print region (an example of the first region) (an example of the first correction value), based on the measured values of density of each of the row regions (S109). The program for obtaining correction values also calculates the correction values for correcting density of a certain row region in the regular print region (an example of the second region) (an example of the second correction value), based on the average of the measured values of density of row regions which is in every seven regions including the measured value of density of the certain row region (S109, See FIG. 21). However, since the correction values in the regular print region are calculated using the average measured value of density of a plurality of row regions, the correction values become discontinuous at the boundary between each of print regions. If density correction is performed with using these correction values, the difference in density becomes conspicuous around the boundary between each of print regions. Therefore, in the above-mentioned second embodiment and third embodiment, the correction values in the front-end print region are modified in order to reduce the difference between the correction values in the front-end print region and the correction values in the regular print region. This can reduce discontinuity between the correction values in the front-end print region and the correction values in the regular print region. As a result thereof, the difference in density becomes less conspicuous around the boundary between each of print regions.

In the above-mentioned embodiment, a front-end modification value is added to the correction values in the front-end print region. However, the invention is not limited thereto. For example, even by subtracting the front-end modification value from correction values in the regular print region, discontinuity can be reduced between the correction values in the front-end print region and the correction values in the regular print region. However, in contemplation of modification of the correction values in the rear-end print region, it is desirable to correct the correction values in the front-end print region so that they become closer to the correction values in the regular print region.

(2-2) In the above-mentioned embodiment, the correction values of the first through thirtieth row regions in the front-end print region (an example of the first correction value) are modified in order to reduce a difference between the average value of the correction values of the twenty-fifth through thirtieth row regions in the front-end print region (an example of a plurality of the first correction values) and the average value of the correction values of the first through fifth row regions in the regular print region (an example of a plurality of the second correction values). As a result thereof, the difference in density becomes less conspicuous around the boundary between each of print regions.

(2-3) In the above-mentioned embodiment, the front-end modification value is the difference between the average value of the correction values of the twenty-fifth through thirtieth row regions in the front-end print region (an example of a plurality of the first correction value) and the average value of the correction values of the first through fifth row regions in the regular print region (an example of a plurality of the second correction value), and the correction values of the first through thirtieth row regions in the front-end print region are modified based on the front-end modification value (see FIG. 32B and FIG. 33B). As a result thereof, the difference in density becomes less conspicuous around the boundary between each of print regions.

(2-4) However, this invention is not limited to cases of using an average value of correction values of a plurality of row regions around the boundary between each of print regions. For example, the correction values can be modified in order to reduce a difference between the correction value of the thirtieth row region in the front-end print region (an example of the first correction value which is contiguous to a row region in the second region) and the correction value of the first row region in the regular print region (an example of the second correction value which is contiguous to a row region in the first region).

(2-5) In this case, it is desirable that the front-end modification value is the difference between the correction value of the thirtieth row region in the front-end print region (an example of the first correction value of the row region contiguous to the second region) and the correction value of the first row region in the regular print region (an example of the second correction value of the row region contiguous to the first region), and that the correction values of the first through thirtieth row regions in the front-end print region are modified based on the front-end modification value.

(2-6) For example, when the scanner is in abnormal operation or otherwise, there are cases in which there is a gradient in the measured values of density of each of row regions depending on the row regions (FIG. 25B). The density correction based on the correction values calculated using these measured values may cause adverse effects on print image quality (see FIG. 29).

Accordingly, in the above-mentioned embodiment, the gradient of the measured values is modified, and correction values in the front-end print region and correction values in the regular print region are calculated based on the modified measured values. This can reduce adverse effects caused by the gradient of the measured values.

(2-7) In the above-mentioned embodiment, the program for obtaining correction values obtains the linear fitting line and the average value Cbt' based on a measurement result of the row regions which are located in the range to be covered by the calculation of the linear fitting line (see FIG. 30A) and calculates a difference between the value of the linear fitting line in each of row regions and the average value Cbt', and the difference is used as the modification value of the measured value of the row region. As a result thereof, even if the gradient exists throughout the measured values, the gradient can be modified.

However, the invention is not limited to the above-mentioned method of calculating modification values. For example, quadratic curve approximation is available instead of linear approximation.

(2-8) In the above-mentioned embodiment, the linear fitting line is calculated using the least-square method. This enables to grasp the tendency of the gradient of measured values. However, the invention is not limited to the above-mentioned method of calculating the linear fitting line. In the least-square method, a linear fitting line that minimizes the sum of the square of differences between the measured values and the linear fitting line is calculated; however, instead thereof, a linear fitting line that minimizes the sum of the differences between the measured values and the linear fitting line can be calculated, for example.

(2-9) In the above-mentioned embodiment, the front-end print region means a region consisting of raster lines formed by front-end printing (an example of the first dot row), and the regular print region means a region consisting of raster lines formed by regular printing (an example of the second dot row) (see FIG. 8). According to the above-mentioned embodiment, the difference in density becomes less conspicuous around the boundary between the front-end print region and the regular print region.

(2-10) It is desirable to use the method for obtaining correction values in which all components mentioned above are included because all advantages are achieved. However, it is not necessary to include all the components. In short, it is only essential that a constitution enables to obtain correction values reflecting the characteristics of the printer.

(2-11) In the above-mentioned embodiment, after modification of the correction values by the program for obtaining correction values, when a print image is formed on the paper (an example of a medium) under instructions by a user, a printer driver generates print data by density correction based on the correction values (S213), and thereby a printer 1 forms the raster lines which the print image consists of, based on the correction values corresponding to row regions in which the raster lines are to be formed. As a result thereof, the print image can be formed without unevenness in density and the difference in density at the boundary between each of the print regions can be reduced.

A correction value can technically be associated with a nozzle, not with a row region. However, there are cases in which there is difference in density of color even among pieces of image formed by the same nozzle. For example, there are cases in which there is difference in density of color even among dot rows formed by nozzle #3 if rows contiguous to each of dot rows formed by nozzle #3 are formed respectively by different nozzles such as nozzle #1 and nozzle #4. Therefore, even if a specific correction value is associated with nozzle #3 and a tone value of pixel data corresponding to a raster line formed by nozzle #3 is corrected based on the correction value corresponding to nozzle #3, unevenness in density cannot surely be suppressed. Accordingly, in the present embodiment, correction values are set corresponding to row regions.

(2-12) As a matter of course, the above-mentioned embodiment discloses methods of manufacturing printers (an example of a printing apparatus) equipped with a memory storing correction values. According to this method of manufacturing a printer, a printer which stores correction values depending on the characteristics of individual printers can be manufactured.

What is claimed is:

1. A method for measuring density, comprising:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions; and modifying respective measured values of the density of each of the row regions based on the respective modification values corresponding to each of the row regions, wherein:

a linear fitting line and an average value are obtained from the at least a part of the measurement result; and the respective modification values corresponding to each of the row regions are calculated respectively depending on a difference between a value of the linear fitting line in each of the row regions and the average value.

2. The method for measuring density according to claim 1, wherein:

the respective modification values corresponding to each of the row regions are calculated based on a measurement result obtained by excluding a measurement result of the row region located at an end section of the pattern from the above-mentioned measurement result of the density of the row regions.

3. The method for measuring density according to claim 1, wherein:

the linear fitting line is calculated based on the least-square method.

4. The method for measuring density according to claim 1, wherein:

if the pattern has a first dot row formed by first printing and a second dot row formed by second printing that is different from the above-mentioned first printing, the at least a part of the measurement result includes a measured value of density of the row region in which the first dot row is to be formed and a measured value of density of the row region in which the second dot row is to be formed.

5. A method for measuring density, comprising:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions; and modifying respective measured values of the density of each of the row regions based on the respective modification values corresponding to each of the row regions, wherein:

the respective modification values corresponding to each of the row regions are calculated based on a measurement result obtained by excluding a measurement result of the row region located at an end section of the pattern from the above-mentioned measurement result of the density of the row regions;

a linear fitting line and an average value are obtained from the at least a part of the measurement result;

the respective modification values corresponding to each of the row regions are calculated respectively depending on a difference between a value of the linear fitting line in each of the row regions and the average value;

the linear fitting line is calculated based on the least-square method; and if the pattern has a first dot row formed by first printing and a second dot row formed by second printing that is different from the above-mentioned first printing, the at least a part of the measurement result includes a measured value of density of the row region in which the first dot row is to be formed and a measured value of density of the row region in which the second dot row is to be formed.

6. A printing method, comprising:

forming on a medium a pattern which consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions;

calculating correction values corresponding respectively to the row regions based on the respective modified measured values; and when forming a print image on a medium, forming dot rows that the print image consists of, based on the correction values corresponding respectively to the row regions in which the dot rows are to be formed, wherein:

a linear fitting line and an average value are obtained from the at least a part of the measurement result; and the respective modification values corresponding to each of the row regions are calculated respectively depending on a difference between a value of the linear fitting line in each of the row regions and the average value.

7. The printing method according to claim 6, wherein:

the correction values corresponding respectively to a predetermined number of the row regions are calculated, respectively; and when forming the print image on the medium, the dot rows are formed by using the correction values corresponding respectively to the predetermined number of the row region repeatedly for each set of the predetermined number of the row regions that the print image consists of.

8. The printing method according to claim 6, wherein:

when forming the print image on the medium, a dot formation process in which the dot rows are formed and a carrying process in which the medium is carried with a predetermined carry amount are repeated; and the correction value corresponding to a certain row region is calculated based on the measured value of density of the certain row region and the measured value of density of another row region that is located an integer multiple of the carry amount from the above-mentioned certain row region.

9. The printing method according to claim 8, wherein:

when forming the print image on the medium, the correction value corresponding to the certain row region is used for forming a dot row to be formed in the certain row region and for forming a dot row to be formed in another row region that is located an integer multiple of the carry amount from the above-mentioned certain row region.

10. The printing method according to claim 8, wherein:

the certain row region is located in a regular print region.

11. The printing method according to claim 6, wherein:

the regular print region of the pattern is smaller than the regular print region of the print image.

12. A printing method, comprising:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions;

calculating correction values corresponding respectively to the row regions based on the respective modified measured values; and when forming a print image on a medium, forming dot rows that the print image consists of, based on the correction values corresponding respectively to the row regions in which the dot rows are to be formed, wherein:

the correction values corresponding respectively to a predetermined number of the row regions are calculated, respectively;

when forming the print image on the medium, the dot rows are formed by using the correction values corresponding respectively to the predetermined number of the row regions repeatedly for each set of the predetermined number of the row regions that the print image consists of, when forming the print image on the medium, a dot formation process in which the dot rows are formed and a carrying process in which the medium is carried with a predetermined carry amount are repeated;

the correction value corresponding to a certain row region is calculated based on the measured value of density of the certain row region and the measured value of density of another row region that is located an integer multiple of the carry amount from the above-mentioned certain row region;

when forming the print image on the medium, the correction value corresponding to the certain row region is used for forming a dot row to be formed in the certain row region and for forming a dot row to be formed in another row region that is located an integer multiple of the carry amount from the above-mentioned certain row region;

the certain row region is located in a regular print region; and the regular print region of the pattern is smaller than the regular print region of the print image, wherein:

a linear fitting line and an average value are obtained from the at least a part of the measurement result; and the respective modification values corresponding to each of the row regions are calculated respectively depending on a difference between a value of the linear fitting line in each of the row regions and the average value.

13. A method of calculating a correction value, comprising:

forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions; and calculating correction values corresponding respectively to the row regions based on the respective modified measured values, wherein:

a linear fitting line and an average value are obtained from the at least a part of the measurement result; and the respective modification values corresponding to each of the row regions are calculated respectively depending on a difference between a value of the linear fitting line in each of the row regions and the average value.

14. A method of manufacturing a printing apparatus, comprising:

preparing a printing apparatus having a memory;

using the printing apparatus, forming on a medium a pattern that consists of a plurality of dot rows formed respectively in a plurality of row regions lined up in a direction intersecting a movement direction in which a plurality of nozzles move, by forming each of the dot rows in the row region arranged in the movement direction by ejecting ink from the nozzles;

reading the pattern by a scanner;

measuring density of each of the row regions of the read pattern;

calculating respective modification values corresponding to each of the row regions, based on at least a part of a measurement result of the density of the row regions;

modifying respective measured values of the density of each of the row regions based on the respective modification values corresponding to each of the row regions;

calculating correction values corresponding respectively to the row regions based on the respective modified measured values; and storing the correction values in the memory wherein:

a linear fitting line and an average value are obtained from the at least a part of the measurement result; and the respective modification values corresponding to each of the row regions are calculated respectively depending on a difference between a value of the linear fitting line in each of the row regions and the average value.

* * * * *